US012709417B2

(12) United States Patent
Schmucki et al.

(10) Patent No.: US 12,709,417 B2
(45) Date of Patent: Aug. 18, 2026

(54) UNMANNED AERIAL VEHICLE AND LANDING SYSTEM

(71) Applicant: OneSec, Inc., Miami, FL (US)

(72) Inventors: Floris Schmucki, Biel (CH); Dannick Riteco, Schwarzenburg (CH)

(73) Assignee: OneSec, Inc., Miami, FL (US)

(*) Notice: Subject to any disclaimer, the term of this patent is extended or adjusted under 35 U.S.C. 154(b) by 0 days.

(21) Appl. No.: 18/909,924

(22) Filed: Oct. 8, 2024

(65) Prior Publication Data

US 2025/0115379 A1 Apr. 10, 2025

Related U.S. Application Data

(60) Provisional application No. 63/655,100, filed on Jun. 3, 2024, provisional application No. 63/588,744, filed on Oct. 8, 2023.

(51) Int. Cl.

*B64U 10/20* (2023.01)
*B64C 1/22* (2006.01)

(Continued)

(52) U.S. Cl.

CPC ............... *B64U 10/20* (2023.01); *B64C 1/22* (2013.01); *B64D 1/12* (2013.01); *B64U 70/97* (2023.01);

(Continued)

(58) Field of Classification Search

CPC .. B64C 1/12; B64C 1/22; B64C 29/02; B64C 29/04; B64U 10/14; B64U 10/20;

(Continued)

(56) References Cited

U.S. PATENT DOCUMENTS 11,319,064 B1 * 5/2022 Wittmaak, Jr. ........ B64D 9/003
11,577,827 B2 * 2/2023 Randall ................. B64U 70/80

(Continued)

FOREIGN PATENT DOCUMENTS

WO 2022119913 A1 6/2022

OTHER PUBLICATIONS

International Search Report Form PCT/ISA/210, Application No. PCT/US2024/050395, date of mailing: Mar. 4, 2025, 4 pages.

(Continued)

*Primary Examiner* — Joshua E Rodden
(74) *Attorney, Agent, or Firm* — The Law Office of Patrick F. O'Reilly III, LLC

(57) ABSTRACT

Systems, devices and methods related to unmanned aerial vehicles and landing systems are described herein. One example disclosed unmanned aerial vehicle includes a vehicle body including an airfoil shape, a plurality of rotors, a payload void within the airfoil shape profile, and a rotatable payload bay disposed within the payload void. A payload delivery system is also described. The payload delivery system includes a payload void, a payload bay, at least one actuator operative to rotate the payload bay with respect to the payload void, and a payload controller operative to eject a payload from the payload bay. Several landing systems and devices for unmanned vehicles are also described. One example landing device includes a frame including a rear surface operative to attach the frame to a vertical glass surface and an aircraft support element operative to receive and support an unmanned aerial vehicle.

16 Claims, 29 Drawing Sheets

(51) Int. Cl.
*B64C 29/02* (2006.01)
*B64D 1/12* (2006.01)
*B64U 50/38* (2023.01)
*B64U 70/97* (2023.01)
*B64U 101/64* (2023.01)

(52) U.S. Cl.
CPC .............. *B64C 29/02* (2013.01); *B64U 50/38* (2023.01); *B64U 2101/64* (2023.01)

(58) Field of Classification Search
CPC ........ B64U 30/20; B64U 30/24; B64U 30/29; B64U 30/294; B64U 30/295; B64U 30/296; B64U 30/297; B64U 50/19; B64U 50/38; B64U 70/97; B64U 2101/64; B64U 2101/66
USPC .......................................................... 244/7 B
See application file for complete search history.

(56) References Cited

U.S. PATENT DOCUMENTS 11,673,662 B1 * 6/2023 Schafer ................. B64C 39/024 244/7 B
11,772,773 B2 * 10/2023 Tao .......................... B64D 1/10 244/6
12,054,256 B2 * 8/2024 Blake ........................ B64C 1/20
12,077,286 B2 * 9/2024 Townsend ............... B64C 17/02
2013/0161447 A1 6/2013 McGeer et al.
2015/0158598 A1 6/2015 You
2015/0210388 A1 * 7/2015 Criado ................... B64U 20/87 244/6
2016/0257424 A1 9/2016 Stabler et al.
2018/0244383 A1 * 8/2018 Valente ............... B64C 29/0033
2019/0023133 A1 1/2019 Renold et al.
2020/0307829 A1 10/2020 Smith et al.
2020/0324885 A1 10/2020 Bernard
2020/0346736 A1 * 11/2020 Krasnoff ................ B64G 1/413
2020/0372814 A1 11/2020 Bos et al.
2021/0380277 A1 12/2021 Walsh et al.
2022/0177109 A1 * 6/2022 Hefner .................... B64C 29/02
2022/0306320 A1 9/2022 Howe et al.
2022/0324561 A1 * 10/2022 Abbott ................... B64U 30/14
2023/0150701 A1 * 5/2023 Yartha ..................... B64C 17/02 244/17.23
2023/0211879 A1 * 7/2023 Ivans .................... B64C 1/1415 244/118.1
2023/0271700 A1 8/2023 Townsend
2023/0322424 A1 * 10/2023 Kamiya ................. B64U 20/70
2024/0140629 A1 * 5/2024 Boomgaard ........... B64U 10/60
2025/0026503 A1 * 1/2025 Miller .................... B64U 10/14
2025/0068188 A1 * 2/2025 Skillen ................... B64D 9/003

OTHER PUBLICATIONS

Written Opinion of the International Searching Authority, PCT Form 237, Application No. PCT/US2024/050395, date of mailing: Mar. 4, 2025, 16 pages.

* cited by examiner

UNMANNED AERIAL VEHICLE AND LANDING SYSTEM

CROSS-REFERENCE TO RELATED APPLICATIONS

This patent application claims priority to U.S. Provisional Patent Application No. 63/588,744, entitled "Scalable drone delivery system, to deliver goods from Storefronts to Balconies, Porches and Front- and Backyards", filed on Oct. 8, 2023; and further claims priority to U.S. Provisional Patent Application No. 63/655,100, entitled "Compact Low Noise Tailsitter Drone for Residential Package Delivery", filed on Jun. 3, 2024, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a drone delivery system. More particularly, the invention relates to the field of unmanned aerial vehicles (UAVs), and more specifically to vertical takeoff and landing (VTOL) drones capable of package delivery.

2. Background

The field of residential drone delivery is currently being held back by the size, noise and range of delivery drones. Due to their large size, they cannot enter balconies, and can therefore only deliver to single family homes with backyards. In addition, their large size and noise makes it impractical for delivery drones to dock directly to brick and mortar businesses. As a result, operators are forced to build significant landing infrastructure for every business that wants to ship their goods with drones. This introduces a significant real estate development effort to any drone delivery operation. In addition, many drones have limited range, which makes them impractical for rural and suburban areas, which are currently the only areas where government regulators allow drone delivery. The desire for small size and long range are in direct conflict, because long range requires wings, ideally wings with a high aspect ratio, that is, a large wingspan. A non-obvious insight that emerges, when one studies this problem more deeply, is that the desire for small size also conflicts directly with the desire for low noise, because large, slow propellers are less noisy than small fast propellers. As such, a radically new aircraft form-factor is desired to solve one or more of these problems.

Moreover, electronic food delivery marketplaces have grown significantly in popularity in recent years. Several companies have demonstrated that delivery drones are a viable way to deliver the meals associated with such electronic food delivery marketplaces. However, existing methods face several challenges that limit their widespread adoption and efficiency.

Currently, there are two main methods that companies use to hand over a meal or other item from a vendor to a delivery drone:

a. In accordance with a first method, the delivery drone stays airborne, hovers at a fixed position outside of the vendor's establishment, lowers a cord, and then lets the vendor attach the payload.
b. In accordance with a second method, a significant piece of landing infrastructure gets installed outside of the vendor's establishment for a drone.

It is in the nature of the restaurant business that food preparation times vary. Therefore, there are certain drawbacks to the first aforesaid method because that method requires the delivery drone and the restaurant associate to meet within a narrow time window.

If the timing between the restaurant associate and the delivery drone is not coordinated correctly, this will either result in the restaurant associate standing outside, waiting for the delivery drone, which increases the labor cost associated with the delivery, or it results in the drone waiting for the associate, which can drain the battery life of the delivery drone.

Many food delivery marketplaces have thousands of restaurants that participate, and some marketplaces even have tens of thousands. At this scale, the second aforesaid method may be too costly, because it requires the restaurant to install a significant piece of landing infrastructure outside every restaurant building. Such drone landing infrastructure might require building permits, and restaurant owners may be hesitant to enter into such a permanent relationship with the drone delivery provider.

These challenges highlight the need for a more efficient, cost-effective, and easily deployable system for drone-based food delivery, particularly in the critical handover phase from restaurant to drone.

BRIEF SUMMARY OF EMBODIMENTS OF THE INVENTION

Accordingly, the present invention is directed to a drone delivery system that substantially obviates one or more problems resulting from the limitations and deficiencies of the related art.

In accordance with one or more embodiments of the present invention, there is provided an example unmanned aerial vehicle In these one or more embodiments, the unmanned aerial vehicle comprises a vehicle body, the vehicle body comprising a front end, a rear end opposite the front end, and a longitudinal axis between the front end and the rear end. The vehicle body further comprising an airfoil shape and at least one wing formed by the vehicle body; a plurality of rotors disposed at the front end of the vehicle body, each rotor comprises at least one attached propeller blade. The plurality of rotors is operative to provide forward thrust in a direction of the longitudinal axis. The vehicle further comprises: a payload void, the payload void being formed by the body and disposed within the airfoil shape of the body; and a payload bay, the payload bay configured to receive a payload, the payload bay being disposed at least partially within the payload void.

In a further embodiment of the present invention, the unmanned aerial vehicle further comprises: a flight control system, the flight control system comprising: at least one motor to drive the plurality of rotors; at least one accelerometer; at least one gyro; and a control module configured to lift and lower the vehicle in a tail-sitter orientation, transition between a tail-sitter orientation and a winged flight orientation, and control a winged flight.

In yet a further embodiment, the unmanned aerial vehicle further comprises: a pair of wings formed by the vehicle body, each wing comprises a proximate end connected to the vehicle body and a distal end apart from the vehicle body, each wing disposed on an opposing side of the vehicle body, and wherein the plurality of rotors are disposed such that when the propeller blades are rotating they collectively span at least 75 percent of a wingspan.

In still a further embodiment, at least two rotors of the plurality of rotors comprise blades that overlap with each other.

In yet a further embodiment at least one rotor of the plurality of rotors have a diameter greater than 40 percent of the wingspan.

In still a further embodiment, the plurality of rotors comprises two rotors, and each rotor comprises two blades attached thereto.

In yet a further embodiment, the plurality of rotors comprises three rotors, a first rotor of the plurality of rotors comprises a single attached blade, and a second rotor of the plurality of rotors comprises two attached blades.

In still a further embodiment, the unmanned aerial vehicle further comprises an S-rod, the S-rod supporting one rotor of the plurality of rotors.

In yet a further embodiment, the unmanned aerial vehicle further comprises a variable pitch mechanism associated at least one rotor of the plurality of rotors.

In still a further embodiment, rapid acceleration of the unmanned aerial vehicle is achieved by reducing a propeller pitch, using the variable pitch mechanism.

In yet a further embodiment, at least one wing of the vehicle is disposed proximate to the front end of the vehicle body.

In still a further embodiment, the at least one wing is contoured so as to be continuously formed by the vehicle body.

In still a further embodiment, the unmanned aerial vehicle further comprises at least one actuator, each actuator operative to increase a surface area of the at least one wing.

In accordance with one or more other embodiments of the present invention, there is provided a payload delivery system for an unmanned aerial vehicle. In these one or more embodiments, the system comprises: a payload void formed by a body of the unmanned aerial vehicle, the payload void being generally rectangular; a payload bay configured to receive, support, and dispense a payload. The payload bay is disposed at least partially within the payload void and rotatably secured within the payload void. The payload bay comprises an axis of rotation relative to the payload void. The system further comprises at least one payload actuator operative to rotate the payload bay relative to the payload void, and a payload controller comprising a processor, a memory, and stored instructions in the memory. The payload controller is operative to eject the payload from the payload bay.

In a further embodiment of the present invention, the processor of the system executes the instructions stored in the memory to: perform a payload sliding operation causing the payload to accelerate linearly toward an open end of the payload bay; and perform an edge removal operation causing the payload lose contact with the payload bay thereby being smoothly ejected from the payload bay.

In yet a further embodiment, the system further comprises: a pusher mechanism disposed within the payload bay, the pusher mechanism configured to cooperate with the payload bay and the payload to urge the payload toward the open end of the payload bay, the pusher mechanism being controlled by the payload controller.

In still a further embodiment, the system further comprises: a plurality of wheels disposed within the payload bay, the plurality of wheels operative to enable the payload slide with respect to the payload bay.

In yet a further embodiment, the system further comprises a payload sensor operative to determine a position of the payload relative to the payload bay, and the payload controller is operative to: rotate the payload bay such that a gravitational force causes the payload to slide toward the open end of the payload bay; monitor input received from the payload sensor, and counter-rotate the payload bay to reduce the gravitational force exerted upon the payload based on input from the payload sensor.

In still a further embodiment, the transition between the rotate operation and the counter-rotate operation are performed according to a heuristic that estimates a time it takes for the payload to slide to a position where edge removal is appropriate.

In yet a further embodiment, the payload controller causes the payload bay to be rapidly rotated downward to accomplish the edge removal operation.

In still a further embodiment, the system further comprises an actuated hinge attached to a wall of the payload bay, the actuated hinges being controllable by the payload controller, and the payload controller causes the actuated hinge to fold the wall downward to accomplish the edge removal operation.

In yet a further embodiment, the system further comprises an actuated slider mechanism attached to a wall of the payload bay, the actuated slider mechanism being controllable by the payload controller, and the payload controller causes the actuated slider mechanism to slide the wall out of the way of the payload to accomplish the edge removal operation.

In still a further embodiment, the payload controller communicates with a vehicle controller, and the payload controller directs the vehicle controller to effect a rapid acceleration of the vehicle thereby significantly reducing a contact force between the payload and an edge of the payload bay to effect the edge removal operation.

In yet a further embodiment, the payload bay comprises an upper wall and a lower wall, the upper wall being shorter than the lower wall, thereby facilitating an easier payload ejection.

In still a further embodiment, a rotational axis of the payload bay is off-centric in relation to the payload void, payload bay being rotatable between a closed state and an open state, the payload bay being disposed lower in the open state relative to the closed state.

In accordance with yet one or more other embodiments of the present invention, there is provided an aircraft landing system. In these one or more embodiments, the aircraft landing system comprises: a landing device comprising: a frame, and at least two retention elements supported by the frame. Each retention element comprises a top end and a bottom end, and each retention element defines a void formed by two upwardly extending prongs and a landing junction disposed between the two prongs proximate to the bottom end of the retention element. The landing system further comprises: an unmanned aerial vehicle comprising: a vehicle body, at least two wings extending from the vehicle body, at least one position sensor, and a flight control system comprising a processor, memory, and instructions stored in the memory. The processor is configured to execute the instructions stored in the memory. The flight control system monitors input from the position sensor to determine the position of the vehicle relative to the landing device, and the flight controller causes the vehicle to position a trailing edge of each wing to rest on a respective landing junction between two respective prongs.

In a further embodiment of the present invention, the system further comprises at least two guide elements, arranged in such a way as to urge each wing of the vehicle into the respective retention element.

In yet a further embodiment, the slide surface comprises a low friction material.

In still a further embodiment, the system further comprises: a safety element disposed at the distal end of each guide element.

In yet a further embodiment, the landing device comprises at least one support element configured to engage the vehicle when the wings rest on the respective landing junctions, thereby enhancing the stability of the vehicle.

In still a further embodiment, the landing device further comprises at least one visual element, and the position sensor is responsive to the at least one visual element, thereby enabling the flight control system to determine the position of the vehicle relative to the landing device.

In yet a further embodiment, the landing device further comprises a charging device and at least two charge transmitting contacts in electric communication with the charging device; the vehicle comprises a battery and at least two charge receiving contacts in electric communication with the battery; and the two charge transmitting contacts cooperate with the two charge receiving contacts to complete a circuit operative for the charging device to charge the battery when the wings to rest on the landing junctions.

In still a further embodiment, the landing device and aircraft are equipped with a set of coils, allowing for inductive battery charging.

In yet a further embodiment, the the landing device further comprises a charging device, the charging device comprises an electromagnetic induction coil; the vehicle comprises a battery an electromagnetic receiver coil in electric communication with the battery; and the induction coil and the receiver coil cooperate to enable the charging device to charge the battery when the wings to rest on the landing junctions.

In accordance with yet one or more other embodiments of the present invention, there is provided an aircraft landing device. In these one or more embodiments, the aircraft landing device comprises: a frame comprising a rear surface, the rear surface comprising an adhesive material operative to attach the frame to a vertical glass surface of a structure; and an aircraft support element operative to receive and support an unmanned aerial vehicle.

In still a further embodiment, the landing device further comprises: a charging device and at least two charge transmitting contacts in electric communication with the charging device. The at least two charge transmitting contacts are configured to provide an electrical charge to a battery of a vehicle when the vehicle is supported in the landing device.

In yet a further embodiment, the landing device further comprises: a charging device and an inductive coil in electric communication with the charging device. The inductive coil is configured to provide an electrical charge to a battery of a vehicle when the vehicle is supported in the landing device.

In still a further embodiment, the landing device further comprises: a dampening mechanism operative to reduce noise transmission from the landing device to the structure.

In accordance with yet one or more other embodiments of the present invention, there is provided an aircraft landing system. In these one or more embodiments, the aircraft landing system comprises: a base; a vertical structure attached to and supported by the base at a lower end of the vertical structure; and an aircraft support element. The aircraft support element comprises an attachment mechanism cooperating with the vertical structure to suspend the aircraft support element at a desired height along the vertical structure. The aircraft support mechanism is operative to receive and support an unmanned aerial vehicle.

In still a further embodiment, the base comprises dimensions that fall within a range of commercial patio umbrella stands.

In yet a further embodiment, the aircraft support element comprises: a frame, and at least two retention elements supported by the frame. Each retention element comprises a top end and a bottom end, and each retention element defines a void formed by two upwardly extending prongs and a landing junction disposed between the two prongs proximate to the bottom end of the retention element.

In still a further embodiment, the landing device further comprises: at least two guide elements. Each guide element being associated with a respective retention element. Each guide element comprises a proximal end disposed closest to the respective retention element, a distal end opposite the proximal end, and a slide surface operative to urge a wing of the vehicle into the respective retention element.

In yet a further embodiment, the landing device further comprises: a charging device and at least two charge transmitting contacts in electric communication with the charging device. The at least two charge transmitting contacts configured to provide an electrical charge to a battery of a vehicle when the vehicle is supported in the landing device.

In still a further embodiment, the landing device further comprises: a charging device and an inductive coil in electric communication with the charging device. The inductive coil is configured to provide an electrical charge to a battery of a vehicle when the vehicle is supported in the landing device.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
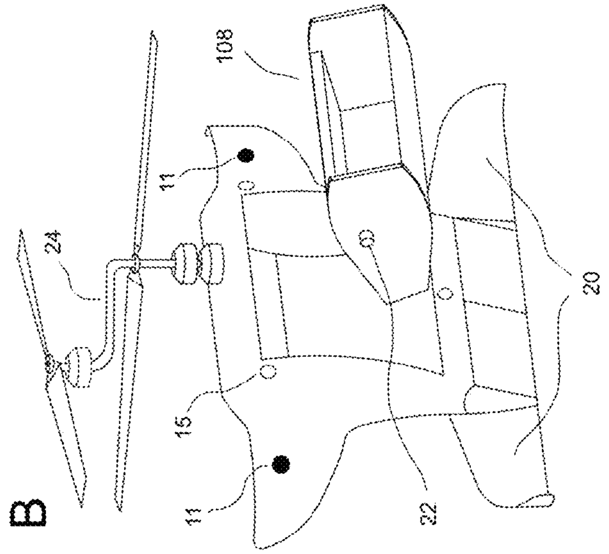
FIG. 1 depicts a first illustrative embodiment of a drone-type aircraft, wherein the drone-type aircraft has a S-rod propeller configuration, and illustration “A” depicts the payload compartment in the drone-type aircraft, while illustration “B” depicts the payload compartment removed from the drone-type aircraft.
Figure 1:
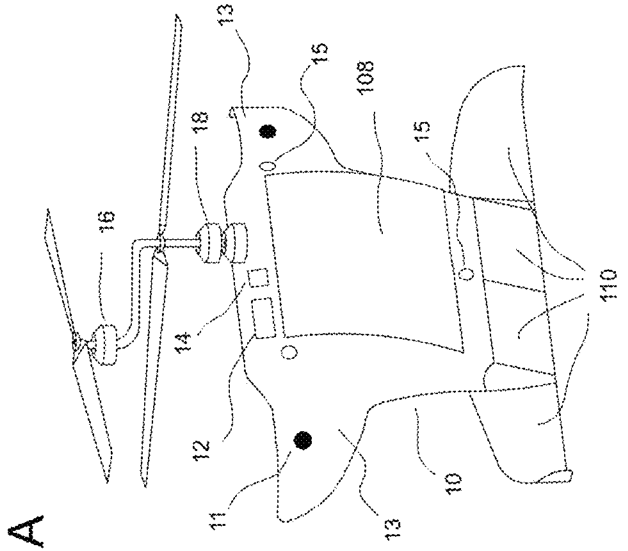

In one or more embodiments described hereinafter, a new aircraft type is described, which was specifically developed to unlock the mass adoption of residential drone delivery, by being small enough to enter balconies, while still having a large payload capacity, long range flight capability, and quiet, low RPM propellers. In addition, a novel payload delivery system was developed which enables smooth deliveries from an airborne drone, without the need for a rope or tether.

In one or more embodiments described hereinafter, a compact, low-noise tailsitter drone designed for residential package delivery is described. This aircraft leverages a blended wing-body configuration, featuring large, overlapping propellers to minimize noise and maximize efficiency while maintaining a compact form factor. The drone's VTOL (Vertical Takeoff and Landing) capability enables precise maneuvering in confined spaces, such as balconies, making it suitable for urban deliveries. Additionally, the drone includes a novel payload delivery system that ensures smooth package release without the need for ropes or tethers. The drone's optimized design addresses the key challenges of noise reduction, long-range capability, and accessibility in residential environments, enabling the widespread adoption of drone delivery services.

In these one or more embodiments, to maximize payload size, while still remaining small enough to fly into balconies, a blended body wing aircraft type was selected, where the majority of the blended body wing consists of an airfoil surrounding a payload compartment. A set of large, overlapping propellers are used, to minimize the RPM and maximize the propeller disk surface. In order to maintain efficient cruise flight, despite the unusually large propellers, a variable pitch mechanism may be implemented. A set of optimizations are described that may improve the aircraft performance and utility.

Also, in these one or more embodiments, a delivery mechanism and system is described for smoothly delivering a rectangular payload box from a tiltable payload bay, overcoming common mechanical issues, such as the payload becoming stuck or tumbling during ejection. The delivery system involves tilting the payload bay to release the package and may utilize mechanisms like a shorter upper wall, linear actuators, or drone control sequences to avoid mechanical singularities.

1. Aircraft

The design of the airframe and propulsion system in one or more embodiments described hereinafter is primarily guided by three considerations: (i) noise reduction, (ii) range optimization, and (iii) compactness, where compactness is defined as being small enough to enter into balconies, with enough distance to walls and railings.

For range optimization, in one or more embodiments, the aircraft utilizes a VTOL (Vertical Take-Off and Landing) configuration, as wingborne flight provides superior efficiency compared to rotorcraft flight. However, rotorcraft flight remains necessary for operations such as balcony deliveries, as well as landings at restaurants, stores, or micro-fulfillment centers in urban areas. Many embodiments may use a tailsitter VTOL configuration, because tailsitter configuration allows for maximal propeller size without the airframe blocking the propeller downwash.

Figure 6:
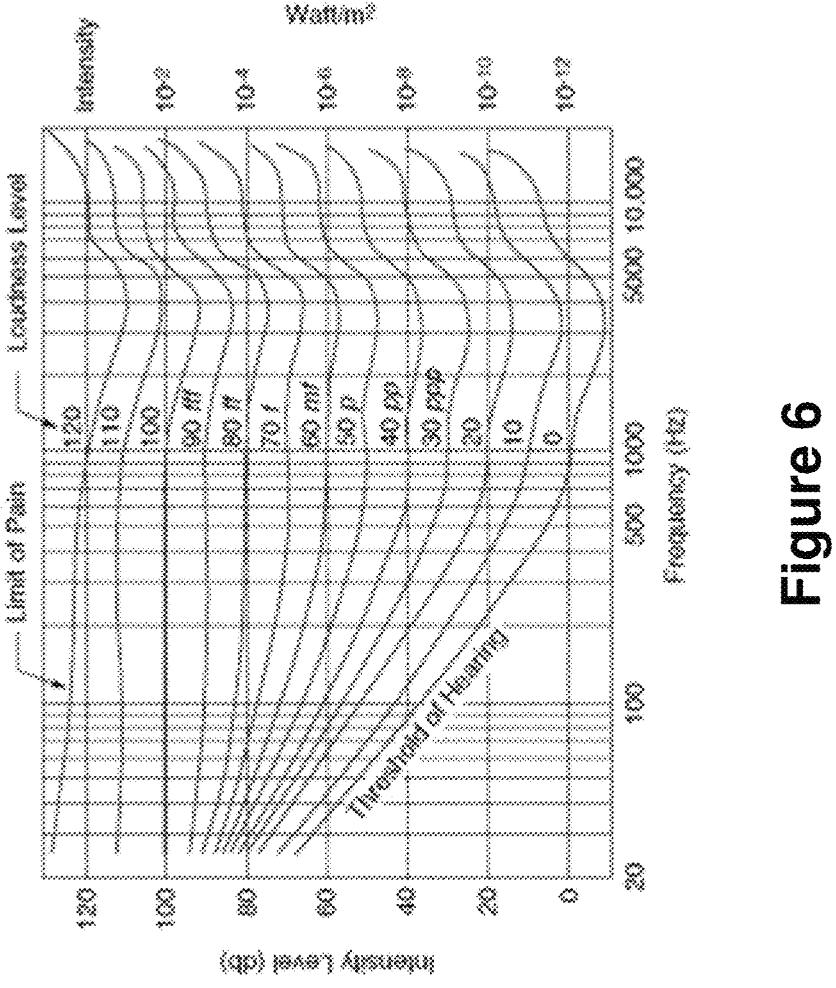
FIG. 6 depicts a chart illustrating a perceived loudness of sounds as a function of intensity and frequency.

In one or more embodiments, to minimize noise during rotorcraft flight, total propulsive energy and RPM should be reduced, because RPM determines noise frequency, which significantly impacts psychoacoustic noise perception (refer to FIG. 6). For any given thrust, the required propulsive energy is inversely proportional to the square root of the total propeller disk surface area. Therefore, the design maximizes the disk surface area, thereby minimizing the propulsive energy and the associated noise.

While the total disk surface area largely determines the propulsive efficiency, and therefore the noise amplitude, the noise frequency also plays an important role, because the human car is much more sensitive to higher frequencies than lower frequencies, particularly in the RPM range of smaller drones. To exploit this tendency, in one or more embodiments, the aircraft uses large propellers that overlap with each other. The overlap enables large propeller size, without increasing the overall footprint of the drone, and the large propeller size reduces RPM and therefore noise frequency.

Now, a plurality of illustrative embodiments of the aircraft will be described hereinafter with reference to their corresponding figures.

Initially, with reference to FIG. 1, a first illustrative embodiment of an aircraft is shown. In the illustrative embodiment of FIG. 4, the drone-type aircraft 10 has a bicopter configuration, where the overall propeller span area is increased, by creating a vertical offset that allows the first propeller tip to go beyond the axis of the second propeller. In this embodiment, the vertical offset is facilitated by an S-shaped rod 24 passing through a lower motor 18 and rotor head that are hollow at the center, where said rod 24 provides the platform for a second upper motor 16.

As shown in the illustrative embodiment of FIG. 1, the drone-type aircraft 10 includes an aircraft body, the aircraft body comprising a front end, a rear end opposite the front end, and a longitudinal axis between the front end and the rear end, the aircraft body further comprising an airfoil shape and a plurality of wings 13, 20 formed by the aircraft body. In the illustrative embodiment, the plurality of wings 13, 20 comprise front wings 13 and back wings 20. Referring again to FIG. 1, a plurality of rotors are disposed at the front end of the aircraft body, where each rotor comprises at least one attached propeller blade, and the plurality of rotors being operative to provide forward thrust in a direction of the longitudinal axis. Also, as shown in FIG. 1, the drone-type aircraft 10 further comprises a payload bay 108 with a main payload bay rotational axis 22 is disposed within the airfoil shape of the body.

Also, as shown in the illustrative embodiment of FIG. 1, the drone-type aircraft 10 further comprises a plurality of wide angle cameras 11, a flight computer system 12 capable of processing neural networks or equivalents, a global navigation satellite system (GNSS) sensor 14, and light emitting diodes (LEDs) 15.

Figure 2:
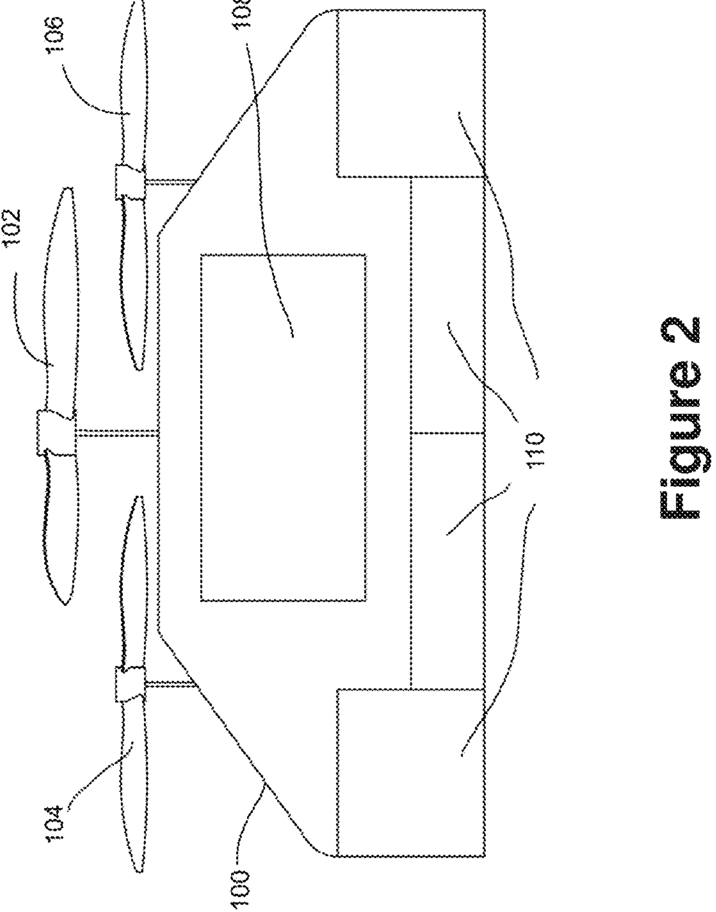
FIG. 2 depicts a second illustrative embodiment of a drone-type aircraft, wherein the drone-type aircraft has a tricopter propeller configuration and a blended body wing airframe.

Next, referring to FIG. 2, a second illustrative embodiment of an aircraft is depicted. In the illustrative embodiment of FIG. 2, the drone-type aircraft has a tricopter configuration. As shown in FIG. 2, the tricopter-type drone 100 comprises a payload bay 108, and control surfaces 110. The tricopter-type drone 100 of the illustrative embodiment further comprises a first single-blade propeller 102, a second dual-blade propeller 104, and a third dual-blade propeller 106.

In some tricopter embodiments, a single-blade central propeller may be used, such that the large propeller can produce substantial thrust, without producing so much torque that the two (2) smaller propellers cannot compensate. These two smaller propellers in contrast, have two (2) blades each, increasing their torque, relative to their thrust. This way, the tricopter can be configured such that the large propeller rotates in one direction, and both of the smaller propellers rotate the opposite direction, roughly equalizing the total torque of the three (3) propellers.

Figure 3:
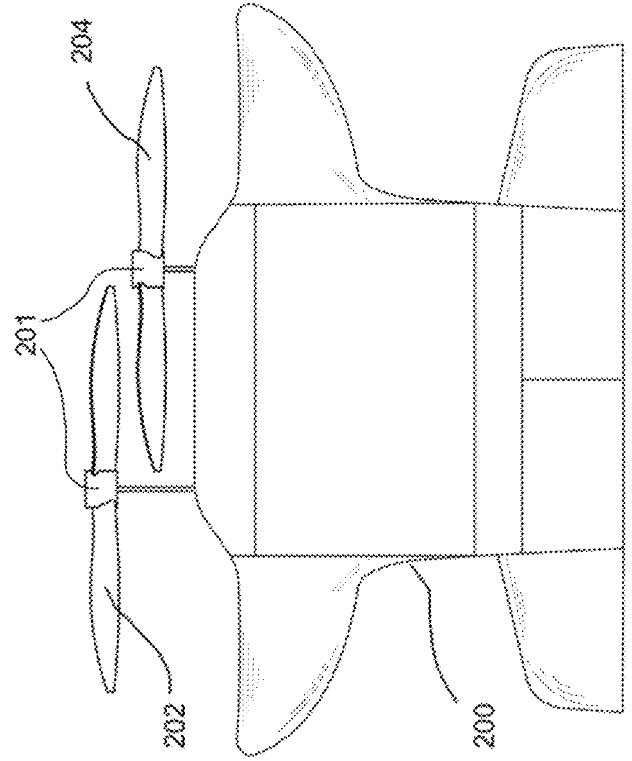
FIG. 3 depicts a third illustrative embodiment of a drone-type aircraft, wherein the drone-type aircraft has a bicopter propeller configuration.

Further, with reference to FIG. 3, a third illustrative embodiment of an aircraft is shown. In the illustrative embodiment of FIG. 3, the drone-type aircraft 200 has a bicopter configuration, with a significant overlap between the two (2) propellers 202, 204. As shown in FIG. 3, each of the dual-blade propellers 202, 204 has a variable pitch rotorhead 201 for adjusting the propeller blade pitch during operation of the aircraft 200, which will be described in more detailed hereinafter.

Figure 4:
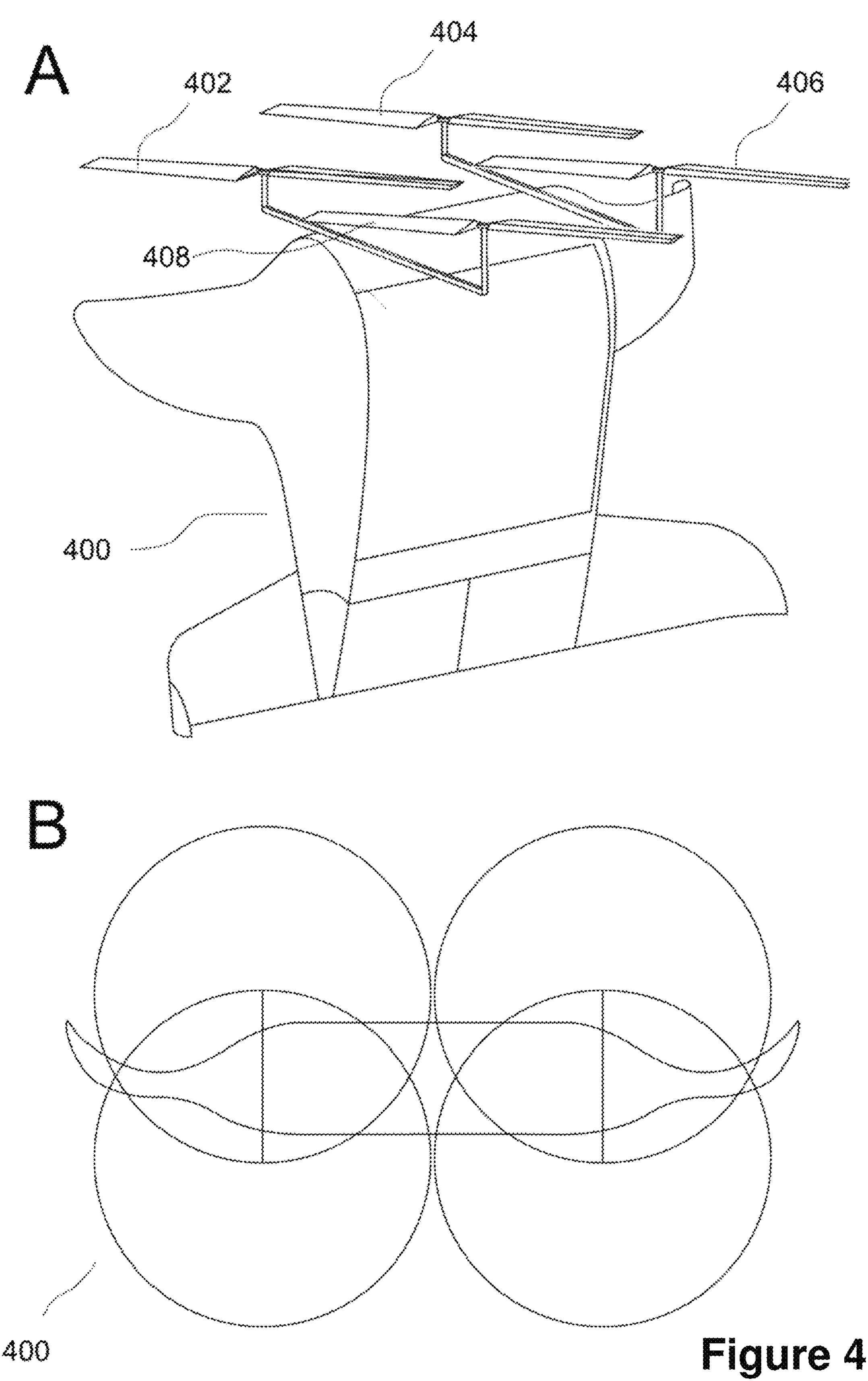
FIG. 4 depicts a fourth illustrative embodiment of a drone-type aircraft, wherein the drone-type aircraft has a quadcopter propeller configuration, and illustration "A" depicts a perspective view of the drone-type aircraft, while illustration "B" depicts a top plan view of the rotational footprints of the propeller blades.

Now, referring to FIG. 4, a fourth illustrative embodiment of an aircraft 400 is depicted. The fourth illustrative embodiment of FIG. 4 depicts a quadcopter arrangement. The quadcopter-type drone 400 of the illustrative embodiment further comprises a first dual-blade propeller 402, a second dual-blade propeller 404, a third dual-blade propeller 406, and a fourth dual-blade propeller 408. In this embodiment, the propellers 402, 404, 406, 408 only overlap in the direction orthogonal to the wing plane. The propellers 402, 404, 406, 408 do not overlap in the wingtip to wingtip direction. This is due to a design principle that is observed by most of the embodiments, where the combined disk surface formed by the propellers is wider than it is long. This shape helps with the fact that most balconies are wider than they are long, and with the fact that a longer wingspan generally improves the lift to drag ratio of the aircraft in cruise. Furthermore, in this embodiment, the two (2) rotors that are further up, are positioned on the side of the drone where the payload bay opens. This prevents the propellers from becoming an obstacle during payload insertion.

All four of the illustrative embodiments described above may contain a variable pitch mechanism on their propellers. Variable pitch is highly beneficial for the aircraft type described herein, and may even be required for many configurations.

Tailsitters with small propellers can get away with a fixed propeller pitch, where said pitch is chosen to be a compromise between ideal hover pitch and ideal cruise pitch. But tailsitters with large, full wing span propeller systems would be highly inefficient in a fixed pitch configuration. This is because (i) during hover, the propeller downwash speed is reduced when the propeller area is large, which means that the optimal pitch is lower than it would be with a smaller propeller, and (ii), the drag related propeller torque during cruise is much greater for the large propellers of this invention, compared to smaller, more typical tailsitter propellers, which directly translates into energy losses. That is why a variable pitch rotorhead 201 (see e.g., FIG. 3) is highly beneficial for the aircraft embodiments described herein. Variable pitch rotorheads have been in use for many decades, and anyone skilled in the art can find designs for variable pitch that are readily available in existing aircraft technologies. These designs allow for the adjustment of blade pitch during operation, optimizing performance across various flying conditions. A common implementation involves a mechanical linkage system that adjusts the angle of each blade independently or in unison, depending on the design specifics. When a typical helicopter swashplate rotorhead is used, variable pitch functionality is usually included by default. In the case of helicopters, variable pitch is often referred to as "collective".

The variable pitch mechanism is particularly important during cruise flight. In some embodiments, during cruise, the pitch may be set such that the center of the blade has an angle of 50 to 70 degrees, and the tip of the blade has an angle of 30 to 50 degrees. This configuration helps optimize the lift coefficient and efficiency during cruise flight. Any lower angle and the required RPM becomes too high, increasing drag related torque and noise, and any higher and the lift vector of the blades becomes almost perpendicular to the flight direction, leading to poor efficiency as well.

In certain embodiments, the propeller blade design may incorporate a roughly rectangular shape for the blade, with a similar chord length near the tip as elsewhere. This design compensates for the small lift coefficient at the tip during hover, producing an even lift distribution throughout the length of the blade. This configuration allows for decent performance in hover, despite a twist that may be more optimized for cruise.

Figure 7:
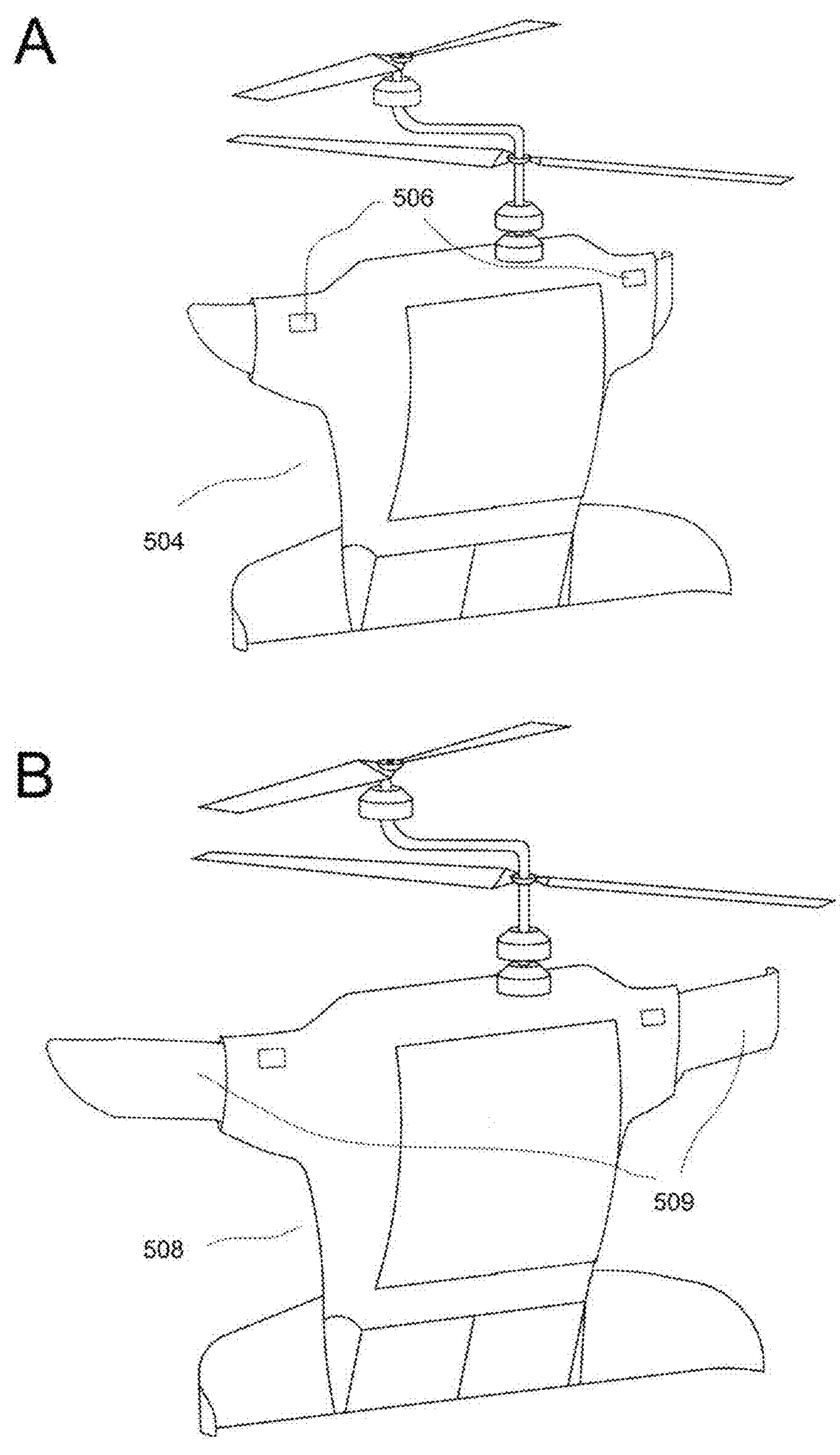
FIG. 7 depicts a fifth illustrative embodiment of a drone-type aircraft, wherein the drone-type aircraft has extendable side wings, and illustration "A" depicts the side wings in a retracted position, while illustration "B" depicts the side wings in an extended position.

One feature that these embodiments have in common is that their propellers form a combined disk surface that roughly spans the entire drone; there may be overlap between some of the propellers. In most embodiments, horizontal offsets were chosen, along the wingtip to wingtip axis, to allow for roll control during rotorcraft flight mode. It is advisable to keep the wingspan within the 60 centimeter (cm) to 110 centimeter (cm) range, and the depth of the drone (equal to propeller diameter in bicopter embodiment) should be kept in the 35 cm to 80 cm range. However, some embodiments may have an extendable wingspan (see e.g., FIG. 7), with a set of actuators 506 capable of sliding or tilting a set of wings 509, to configure said wings in such a way that the wingspan during cruise increases significantly, compared to the smaller wingspan in the retracted state. Illustration "A" of FIG. 7 depicts the side wings 509 of the aircraft in a retracted position 504, while illustration "B" depicts the side wings 509 of the aircraft in an extended position 508.

To satisfy the compactness constraint, while still allowing a useful payload size, the embodiments of the aircraft described herein may use a blended body wing aircraft shape. This blended body wing airframe comprises one or more parts, including a main body part, which takes up a significant portion of the entire wingspan, and the majority of the entire lifting surface of the aircraft. This main body part is essentially a thick airfoil surrounding a rectangular payload area. The span of this main body part should be between one-third (⅓) and two-thirds (⅔) of the total wingspan.

This departs significantly from industry standards, where such large bodies are not used with such short wings, but in hundreds of wind tunnel experiments, the present inventors have found that it can work effectively, especially if some of the following measures are taken to improve the aerodynamic efficiency: (i) choosing an efficient, thick, airfoil; (ii) having front wings and back wings with a chord length, position and taper ratio as depicted in the drawings (referred to the S rod embodiment in FIG. 4). Wind tunnel experiments have shown that this front wing shape, size, and position to be ideal for aerodynamic efficiency. The key characteristic in this embodiment is that these front wings have a chord length smaller than one-half (½) of the main body chord length, and are installed in the front half of the main body. Said an arrangement has been found to reduce induced drag the most. However, as someone skilled in the art may realize, a more traditional blended body wing shape, such as the one depicted in the tricopter embodiment of FIG. 2 with a typical blended body wing triangular body shape may be used as well, without departing from the spirit of the desired aircraft design.

Another significant finding from the wind tunnel tests has been that a smooth transition between the body and the sidewing(s) can yield substantial aerodynamic benefits. This phenomenon seems to be more pronounced at Reynolds numbers experienced by delivery drones, than for manned aircraft. Another aerodynamic improvement can be gained by having winglets on the front wings 13, and sharklets on the back wings 20, where the direction of winglet and sharklet are opposed to each other. Some or all of these measures may be taken, depending on the embodiment. Because the embodiments of the aircraft described herein include a large payload bay, the center of mass position of the payload can vary significantly. It is therefore advisable to configure the aircraft with unusually large control surfaces 110. For example, in the S-rod embodiment of FIG. 1, the backwings may be entirely tiltable by actuators.

The airfoils chosen for the front wings and backwings may be taken from an airfoil database, focusing on airfoils that perform well at low Reynolds numbers. For the body airfoil, an airfoil database may be consulted as well, this time putting less emphasis on the low Reynolds number performance, and more emphasis on the thickness of the airfoil. The inventors have found a thickness of 30% to be ideal. Going much thicker than that results in poor aerodynamic performance according to our wind tunnel tests. And going much thinner than 30% makes the drone body unnecessarily long, making it difficult to enter balconies.

2. Delivery Mechanism

Figure 5:
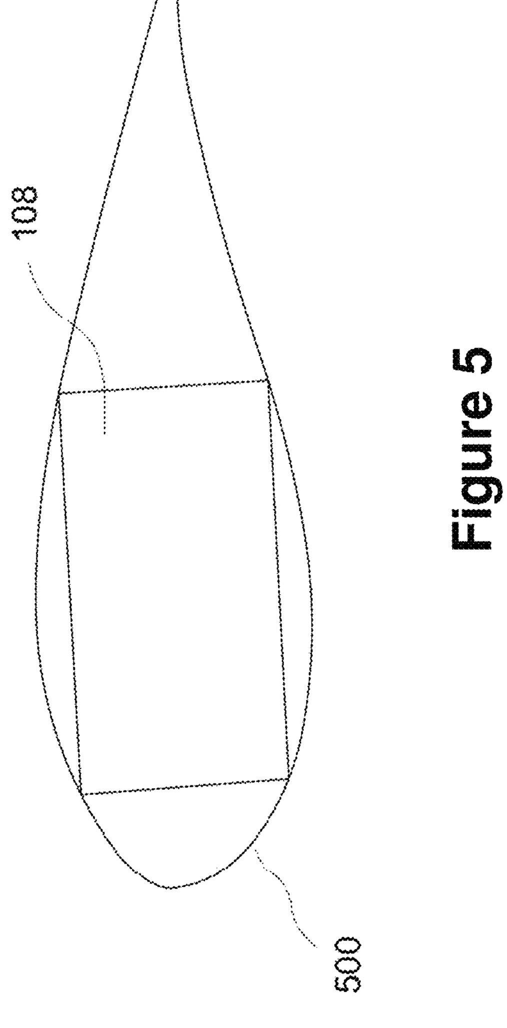
FIG. 5 depicts a cross section of an illustrative drone-type aircraft where a size and position of a payload bay within the drone-type aircraft is illustrated.

In various embodiments, the aircraft described herein may include a payload compartment. The outside wall of said payload compartment may substantially match the airfoil profile 500 of the aircraft (see e.g., FIG. 5), while the inside of the payload compartment 108 may be substantially rectangular and open on one side. The payload compartment may be installed on an actuated axis 22 (see e.g., FIG. 1), which can allow an actuator to rotate the payload compartment relative to the rest of the aircraft body. In some implementations, the axis may be substituted with a set of hinges or sliding attachments, without departing from the spirit of the desired aircraft design.

Figure 8:
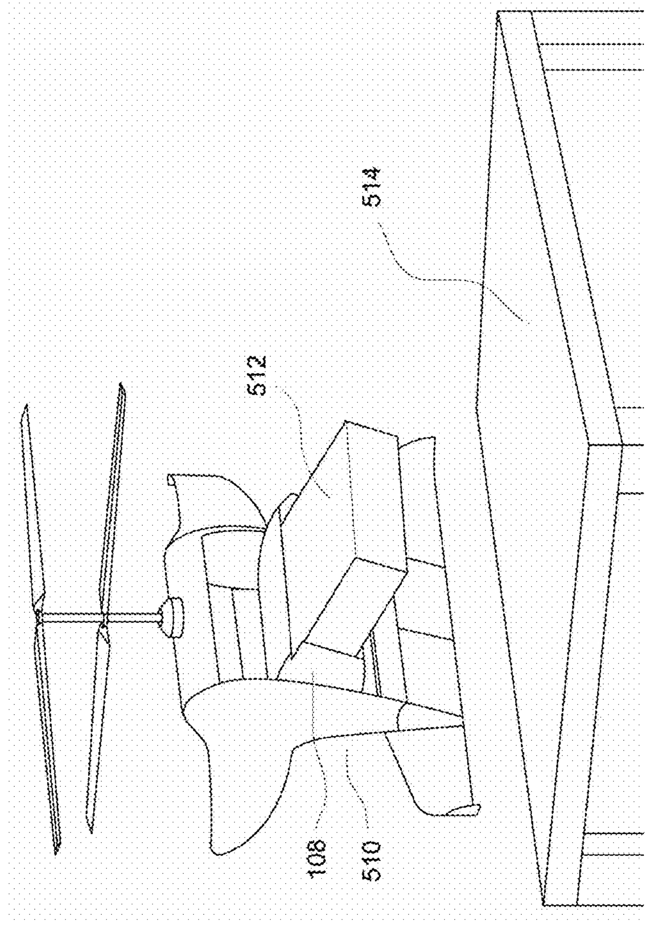
FIG. 8 is a perspective view of a drone-type aircraft delivering a payload to a table.
Figure 9:
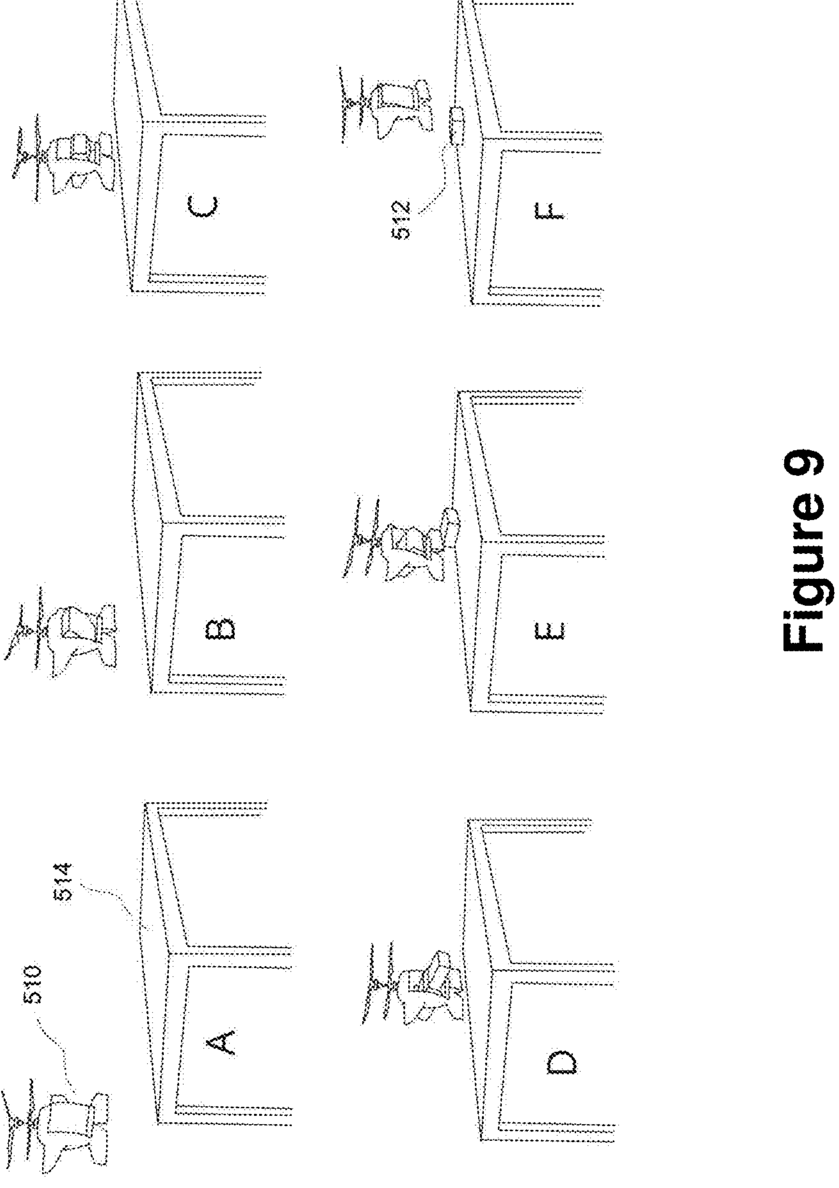
FIG. 9 depicts a delivery process, where illustrations "A", "B", "C", "D", "E", and "F" in the figure illustrate six (6) different phases of delivery, in chronological order.

FIG. 8 depicts an illustrative embodiment of a tailsitter drone 510 delivering a payload box 512 to a table 514. FIG. 9 depicts an illustrative delivery process of a payload box 512 to a table 514, where illustrations "A", "B", "C", "D", "E", and "F" in FIG. 9 illustrate six (6) different phases of delivery, in chronological order.

Figure 10:
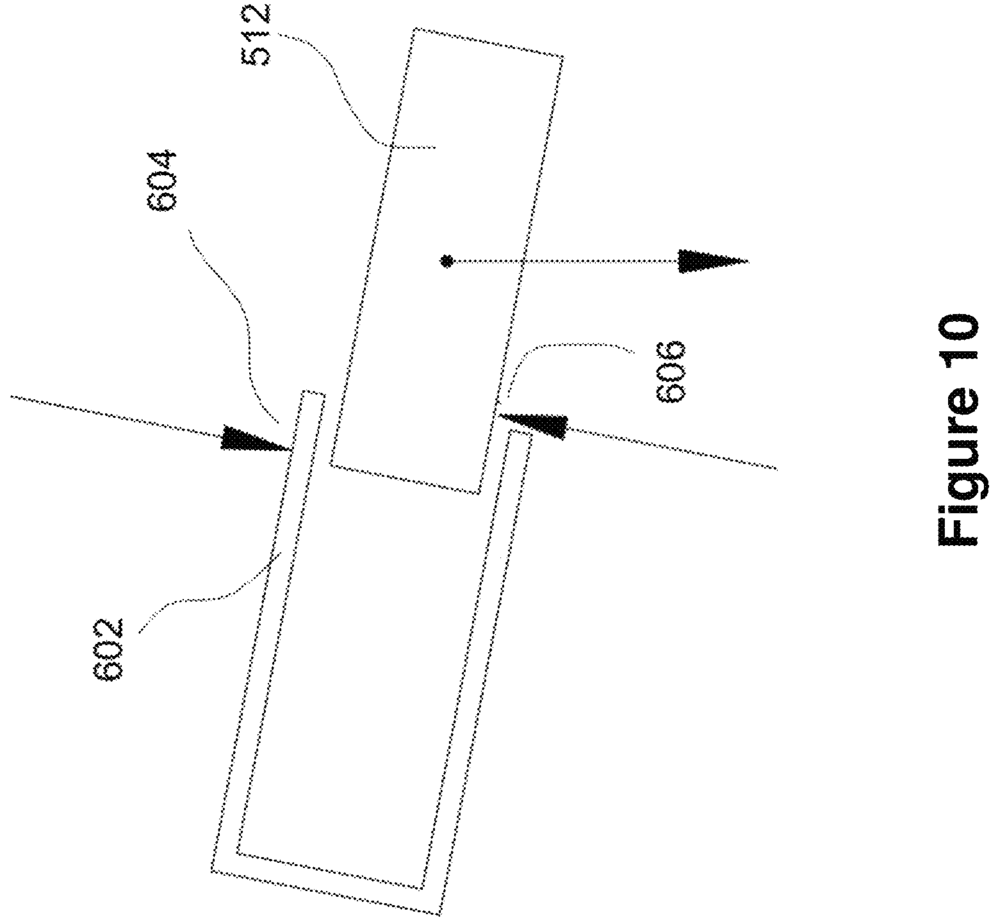
FIG. 10 depicts a mechanical singularity that can cause the payload box to get stuck if the upper and lower walls of the payload bay have the same length.

To deliver the package, the payload bay may be tilted open by the payload axis or an equivalent mechanism. Once open, the payload box can slide out, either through gravity or by an active pusher mechanism. However, in configurations where the upper wall is as long as or longer than the lower wall, a mechanical singularity may occur, potentially causing the payload box to get stuck (see e.g., FIG. 10). As shown in FIG. 10, the upper wall 602 of the payload bay is generally the same length as the lower wall of the payload bay.

This mechanical singularity can be understood through the law of leverage. The gravity force of the payload box 512 may result in two contact forces 604, 606 between the payload bay and payload box 512 as it slides out (i.e., a first contact force 604 between upper payload bay edge and payload box 512, and a second contact force 606 between lower payload bay edge and payload box 512—see FIG. 10). When the overlap becomes small, i.e., when the payload box has almost fully ejected from the payload bay, the lever arm on the payload bay may become infinitesimally small, potentially leading to two extremely large contact forces. The friction caused by these contact forces may cause the payload to get stuck, a risk that may be especially pronounced if no pusher mechanism is used.

Figure 11:
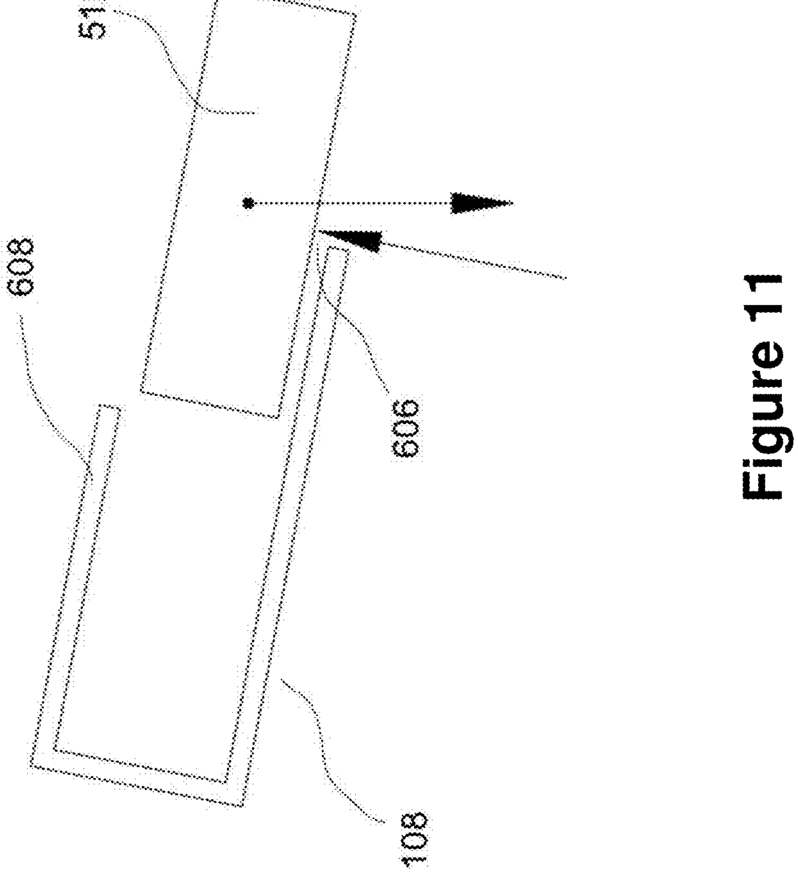
FIG. 11 depicts a payload bay having a shortened upper wall so as to prevent the mechanical singularity problem depicted in FIG. 10 from occurring when a payload box is being ejected from a payload bay.

In some embodiments, this risk may be mitigated by making the upper wall 608 of the payload bay 108 shorter than the lower wall (see e.g., FIG. 11). To address the gap created by the shorter wall, the non-rotating part of the drone body may be extended in certain implementations, closing the gap during normal flight when the payload is closed.

While making the upper wall shorter may help ensure that the payload is less likely to get stuck, a trivial ejection method may lead to another issue: As the payload slides out, it may develop rotational speed and tumble out of the payload bay. This could result in a suboptimal delivery, where the payload may land on an edge or continue to tumble on the delivery surface.

Figure 12:
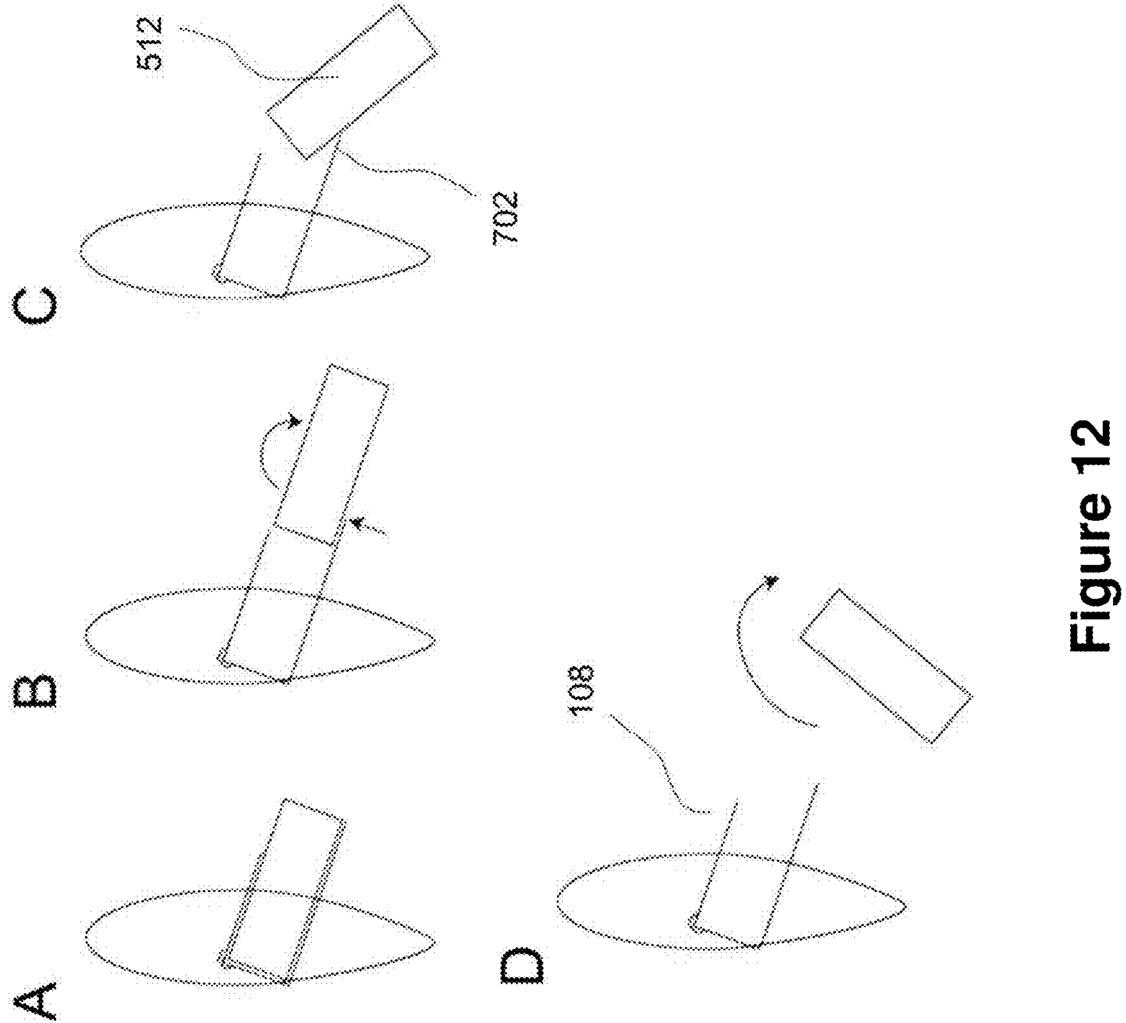
FIG. 12 depicts a problem where a payload box tends to rotate and tumble if ejected from a payload bay in a trivial manner, where illustrations "A", "B", "C", and "D" in the figure illustrate four (4) different phases of the payload box ejection, in chronological order.

This tumbling problem may be exacerbated by propeller downwash, which can get under the payload if it is tilted, potentially further destabilizing the landing trajectory. Referring to FIG. 12, the rotational speed may develop because the rear edge of the payload 512 maintains contact with the lower edge 702 of the payload bay 108, while the rest of the payload 512 is accelerated downwards due to gravity and propeller downwash. The tumbling problem is diagrammatically illustrated in illustrations "A", "B", "C", and "D" of FIG. 12.

To address this issue, one or more embodiment of the aircraft described herein may include one or more of a physical mechanism and a flight control sequence. These features may ensure that the lower edge of the payload bay is pulled away from the payload as soon as the payload gains freedom of rotation. In this way, the payload may not have an edge over which it can tumble. The payload may enter a state of complete free fall, with no contact with the drone, potentially preventing the induction of rotational energy.

Figure 13:
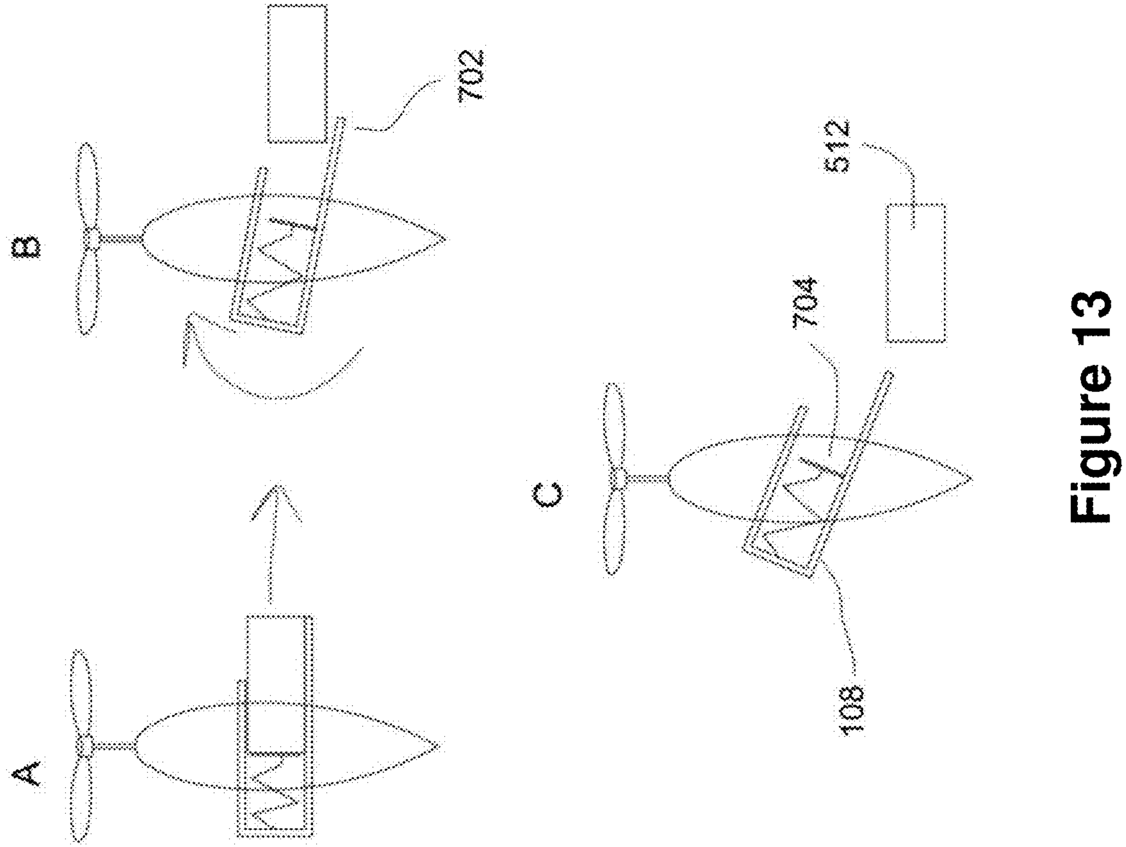
FIG. 13 depicts one mechanism for preventing the problem depicted in FIG. 12 from occurring when a payload box is being ejected from a payload bay, where illustrations "A", "B", and "C" in the figure illustrate three (3) different phases of the payload box ejection, in chronological order.

The illustrative embodiment of FIG. 13 depicts a payload pusher mechanism 704 for preventing the tumbling problem described above from occurring when a payload box is being ejected from a payload bay, where illustrations "A", "B", and "C" in FIG. 13 illustrate three (3) different phases of the payload box ejection, in chronological order.

In one or more embodiments, the ejection sequence may be set up in the following three phases described below: (i) Phase 0, (ii) Phase 1, and (iii) Phase 2.

In Phase 0, the payload bay may be opened by tilting it on its axis.

Figure 18:
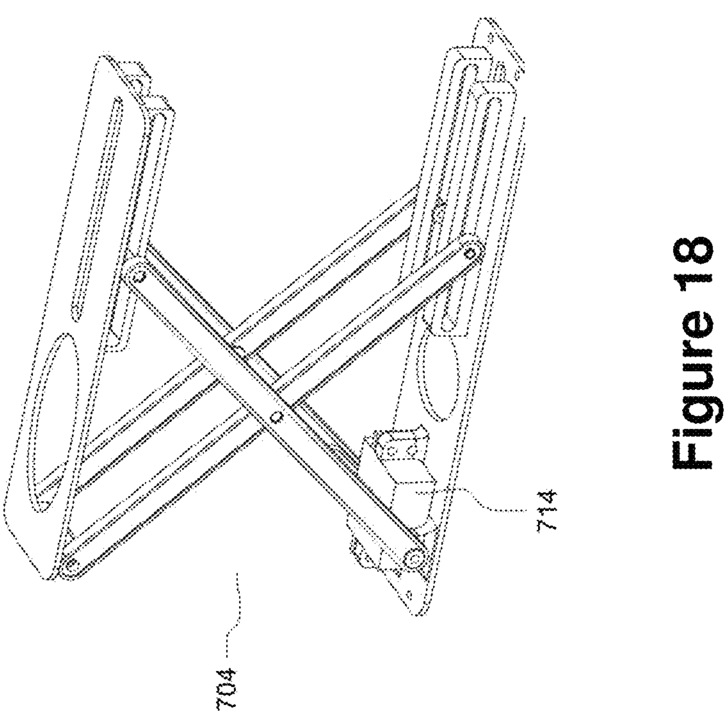
FIG. 18 depicts an embodiment of a payload pusher mechanism that may be installed in a payload bay, for better payload ejection.

In Phase 1, this phase may be characterized by linear acceleration. Typically lasting between approximately 100 and 500 milliseconds, the payload box may be accelerated linearly with respect to the upper and lower walls of the payload bay. This may be done with gravity, or by tilting the payload bay downwards, or by accelerating the drone body using its propellers and control surfaces. But for best results, a physical mechanism may be used, where for example a payload pusher is installed in the back of the payload bay, using a scissor lift, worm gear, pneumonic device, or other linear actuator (see e.g., FIG. 18). This payload pusher 704 of FIG. 18, which is in a form of a scissor lift payload pusher, can push the payload. In FIG. 18, it can be seen that the payload pusher 704 comprises a servo actuator 714. It is helpful if the inner walls of the payload bay are lined with a low friction material.

In some embodiments, the inner walls of the payload bay may be lined with a low-friction material to facilitate smooth movement of the payload.

Figure 16:
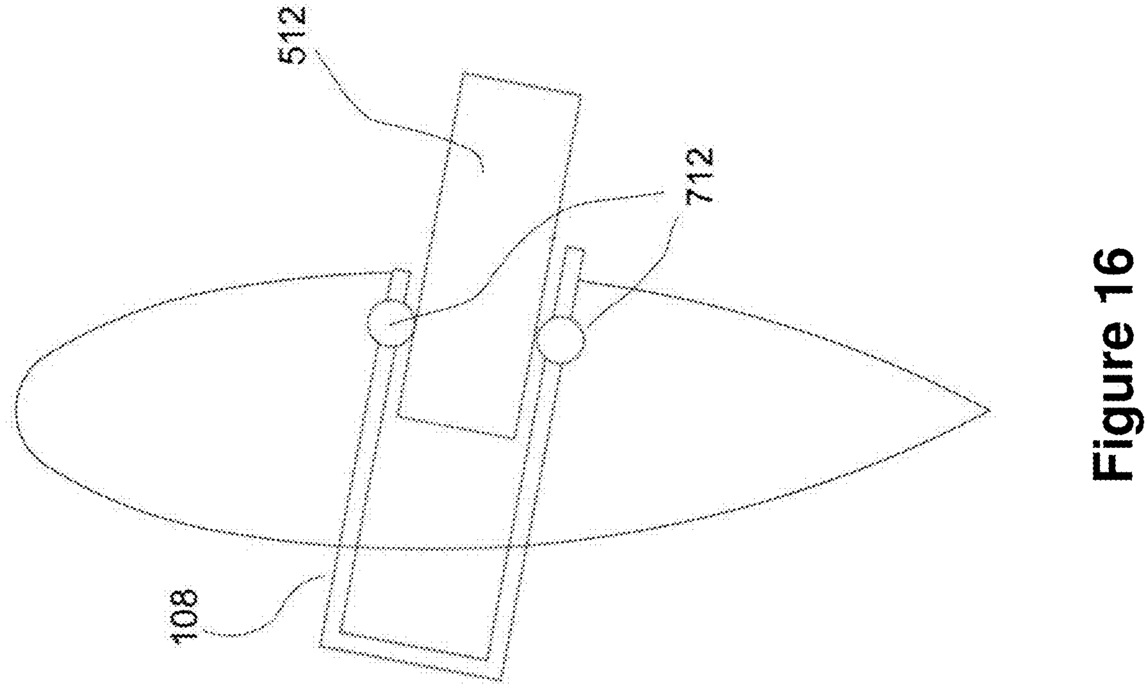
FIG. 16 depicts another embodiment where a payload is pushed out of the payload bay using a set of wheels.

Alternatively, a set of mechanized wheels or rollers may be employed. These may spin, making contact with the payload and transferring linear force to the payload in a manner similar to how wheels on a car transfer force to the road. An example of this configuration is illustrated in the wheel embodiment depicted in FIG. 16. As shown in FIG. 16, the payload bay 108 comprises a plurality of wheels 712 that making rolling contact with the payload box 512.

In implementations without a mechanical pusher, a control sequence may be utilized. This sequence may first move the drone in such a way that the payload bay and payload are accelerated forward. Later, the drone may move backwards and/or downwards to create relative velocity between the payload and payload bay.

It is important to note that during the latter part of phase 1, the payload bay should not rotate downwards with respect to the global reference frame. It may be held still or rotated slightly upwards. If it rotates downwards (that is to say, clockwise in most ejection-related drawings of this document), this downward rotation may be transferred to the payload, potentially causing it to continue rotating as it leaves the payload bay, which may create or amplify the tumbling problem described earlier.

A slight upward rotation, however, may be less problematic for two reasons:

1. It tends to be cancelled out by the contact with the lower edge and the propeller downwash, which may induce a forward rotation even if the countermeasures of the embodiments described herein are used.
2. If the payload lands with a slight upwards angle on the delivery surface, this may be less problematic because inertia will likely cause it to fall flat. This is in contrast to the scenario with downward rotation, where the front edge hits the delivery surface first, potentially causing the payload box to tumble over that edge.

In most cases, maintaining a static horizontal angle during phase 1 may be sufficient, as this may transfer linear velocity to the payload without imparting rotational velocity.

In Phase 2, this phase may be initiated as soon as the payload reaches the point where it can rotate freely, i.e., when its rotation is no longer constrained by the upper wall. At this point, it is crucial that contact between the lower edge and the payload is rapidly broken.

Figure 15:
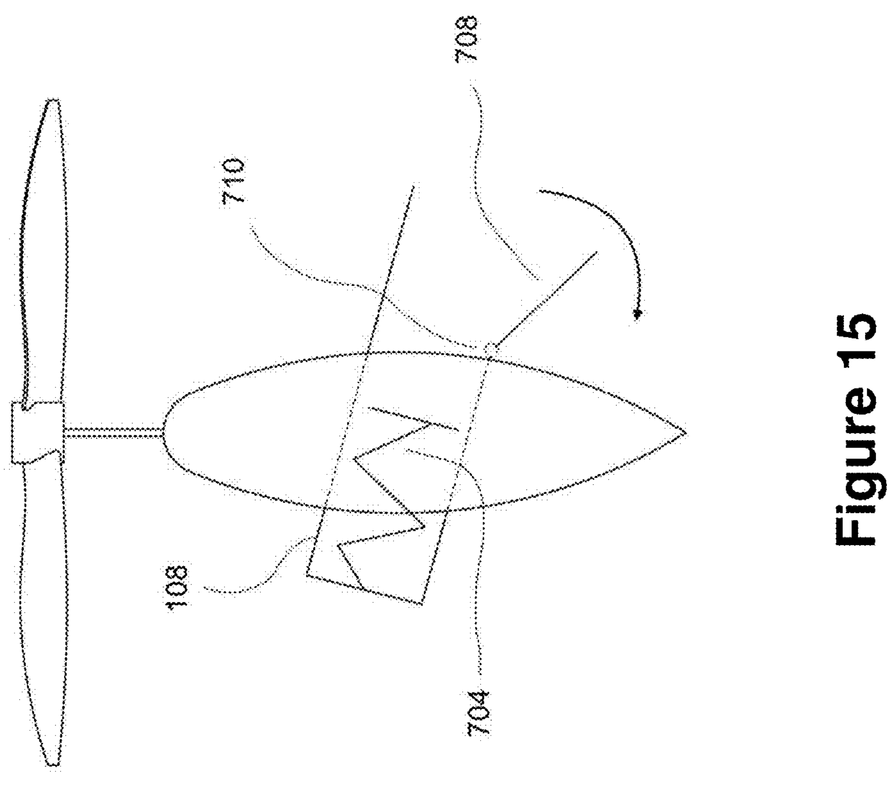
FIG. 15 depicts yet another mechanism for preventing the problem depicted in FIG. 12 from occurring when a payload box is being ejected from a payload bay, wherein the payload bay is provided with a lower edge falling hatch device.
Figure 14:
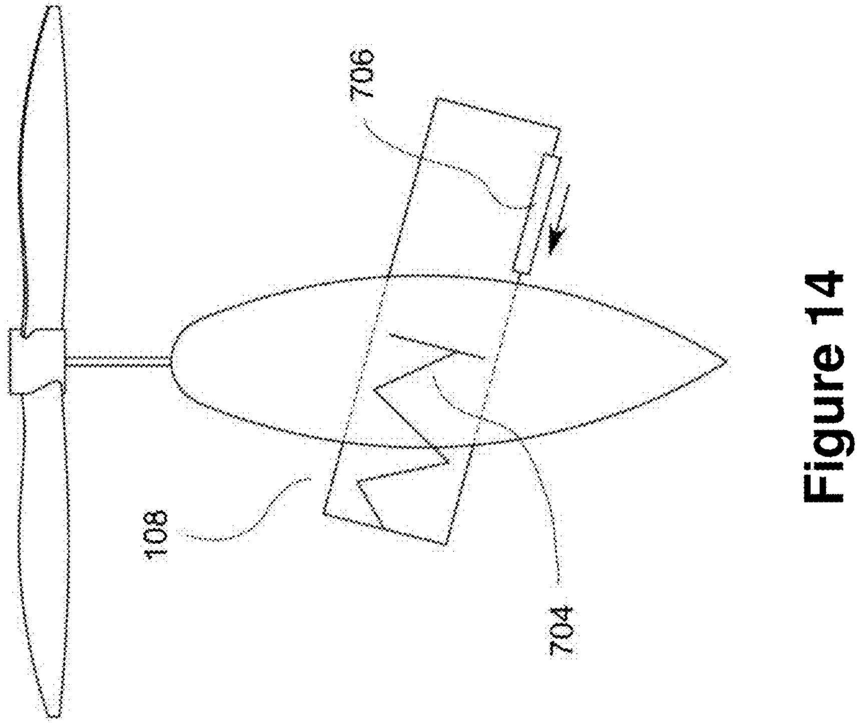
FIG. 14 depicts another mechanism for preventing the problem depicted in FIG. 12 from occurring when a payload box is being ejected from a payload bay, wherein the payload bay is provided with a slider and pusher mechanism.

This contact-breaking may be achieved through several methods, which may include but are not limited to:

1. A slider mechanism 706, as depicted in the slider and pusher embodiment of FIG. 14. In FIG. 14, the payload bay 108 comprises a payload pusher 704 and a lower edge slider 706. In this embodiment, the lower edge slider 706 may pull back the lower edge.
2. A falling hatch mechanism 708, which may tilt down the last section of the lower wall. The falling hatch mechanism 708 is depicted in the illustrative embodiment of FIG. 15. As shown in FIG. 15, the payload bay 108 comprises a payload pusher 704 and a lower edge falling hatch 708 rotatably disposed about an actuated hinge 710.
3. Utilization of the main payload axis. It may be rotated downwards to pull the lower edge away from the payload box. To enable this, it may be important to use an actuator fast enough to pull the edge away. Common RC servos with update rates greater than approximately 200 Hz may be sufficiently fast, provided there is no significant gear reduction between the payload bay axis and the servo.
4. Variable pitch propeller blades may be employed to rapidly reduce the thrust of the propellers, moving the entire drone downwards.
5. Throttle to the motors may be rapidly reduced, or the motors may be actively braked. However, in embodiments where the propeller blades are relatively large, the inertia of the propellers may be too great to create meaningful thrust reduction during the short duration of phase 2 (approximately 10 to 100 milliseconds, depending on how the end of phase 2 is defined). For this reason, a variable pitch mechanism may be more effective if motor thrust reduction is desired as the primary mechanism to enable phase 2.
6. The drone body itself may be controlled to follow a trajectory that breaks contact with the payload. This trajectory may consist of a rapid downward and/or backward movement of the drone.

For contact-breaking methods 1 through 3 described above, in most conventional servos and motors, it may be advisable to apply the maximum force/command that the system allows. Experiments have shown that acceleration greater than approximately 1 g may be required to fully break contact and avoid tumbling. This is because gravity accelerates the payload downwards at 1 g, and the downwash airflow of the propeller may push it down further, creating a net downward acceleration greater than 1 g. The lower edge of the payload bay may need to match or exceed this acceleration to avoid a contact force that could induce rotation in the payload box.

Contact-breaking 4 and 5 described above may offer additional benefits:

a. They may reduce the propeller downwash acting on the payload, which may help mitigate the tumbling problem.
b. They may cause the payload to land more gently, without the vertical force caused by propeller-generated wind.
c. Importantly, they may reduce the risk of air getting beneath the payload after it has landed, which could cause it to be blown away from the initial landing spot.

It should be noted that since phase 2 is typically very short, a significant thrust reduction may not cause the drone to crash or lose an unreasonable amount of altitude, provided the ejection sequence is properly tuned. The drone may lose some altitude, but once the payload is safely ejected or landed, the propellers can be commanded to produce regular thrust again, potentially re-stabilizing the vertical position of the drone. It is also worth noting that after delivery, the total mass of the drone is reduced, which may make the required thrust increase after delivery less extreme.

Timing may be an important factor in the success of this operation. Generally speaking, the switch from phase 1 to phase 2 may need to occur with a precision of approximately 20 milliseconds or better. If phase 2 is initiated too late, the lower edge and payload bay may maintain a strong contact force for a meaningful amount of time, potentially causing the payload to rotate.

To achieve this precise timing, various methods may be employed. These may include, but are not limited to:

a. Using a set of optical, physical, or electrical sensors to detect when the payload has reached the end of the upper wall, in order to initiate phase 2.
b. Implementing a simple feed-forward sequence without sensors, particularly when a pusher mechanism is present. In this approach, the pusher mechanism may be commanded to push the payload for a specific duration, after which phase 2 is initiated. This time period may be a parameter that can be tuned empirically. It may be advisable to run the propellers during the empirical testing and tuning to simulate the effect of the propeller downwash.
c. Incorporating a variable parameter into the controller that represents the mass of the payload. This parameter may be useful because the mass affects the time period it takes for the pusher to move the payload to the exit point where phase 2 needs to start. A separate algorithm or heuristic may be used to estimate the payload weight during earlier flight phases, and this weight estimate may then be used to set the parameter for the timing of the switch between phase 1 and 2.

Figure 17:
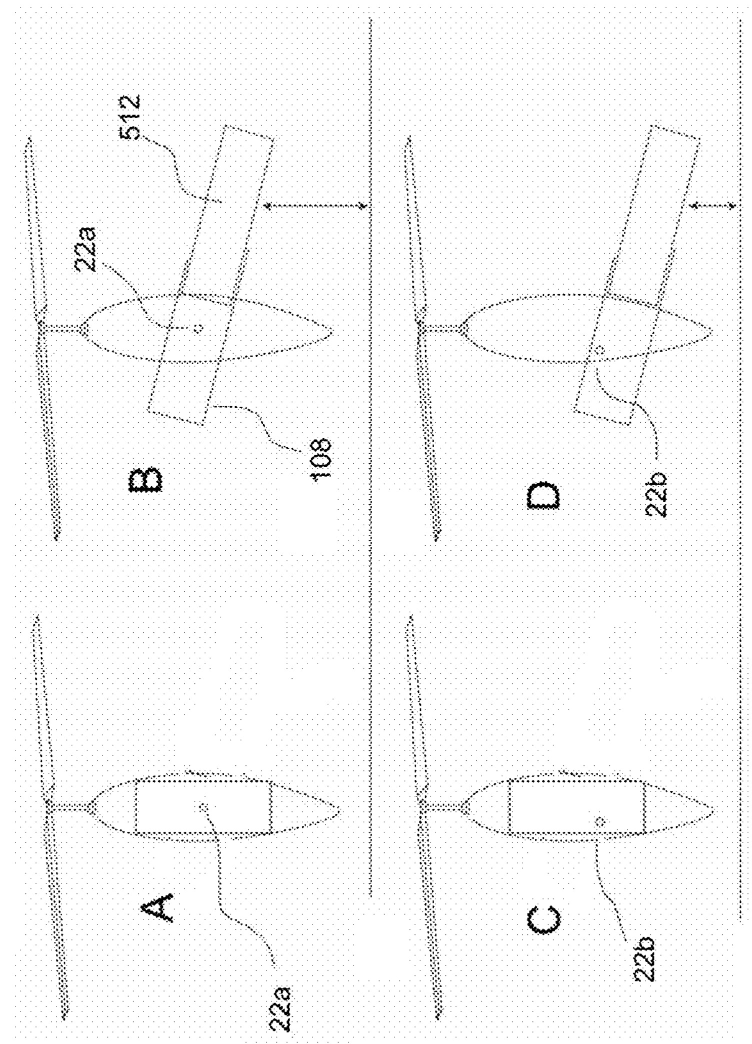
FIG. 17 depicts a payload bay design that allows for a smaller dropping height, by placing the payload rotation axis in an off-centric position.

In some embodiments, an additional feature that may help make the delivery smoother is the use of an off-center payload axis. If this axis is positioned on the lower side, and/or the rear side (with respect to the delivery location), then the payload bay as a whole may be lower when it is opened. This configuration may reduce the drop height of the payload, potentially creating a smoother delivery. This design configuration is illustrated in the bottom two illustrations of FIG. 17. In FIG. 17, illustrations "A" and "B" depict a payload bay 108 with a main payload bay axis **22*a* positioned at the center of the payload bay, while illustrations "C" and "D" depict a payload bay 108 with an off-centric main payload bay axis 22*b***.

These various mechanisms and methods described above, either individually or in combination, may contribute to a more controlled and reliable payload delivery system, potentially reducing the risk of payload damage or loss during the delivery process.

In summary, the present application discloses an example tailsitter VTOL drone, with large propellers that overlap with each other. The propellers are arranged in such a way that their combined disk area forms a mostly continuous surface that spans substantially the entire wingspan of the drone. The airframe of the tailsitter consists of a blended body wing, where the majority of the blended body wing consists of a wing profile surrounding a payload compartment.

A majority of the propellers of the tailsitter VTOL, as measured by disk surface, have a variable pitch mechanism.

The wing profile of the tailsitter VTOL surrounds a payload compartment and constitutes the central body of the drone, with at least one set of smaller side wings attached on the lateral sides of the body, close to the leading edge of the body's wing profile.

The transition between the body and at least one set of sidewings is continuous and curved, with no major sharp edges or corners The wingspan of the VTOL may be artificially extended through a set of actuators that slide or tilt a set of wings. Therefore allowing a larger wingspan during cruise than during urban deliveries.

The present application further discloses a payload delivery apparatus for drones, comprising a mostly rectangular payload bay, and one or several actuators that are controlled through a program running on a processor on the drone. Said payload bay has an axis on which it can rotate relative to the drone, and where said axis is controlled by one or more actuators. Further, the program is configured to eject the payload in multiple phases including: a sliding phase, where the payload box is accelerated linearly, causing it to leave the payload bay; and an edge removal phase, where the outer edge of the payload bay is rapidly lowered or retracted, such that the payload loses contact with the outer edge, and therefore doesn't rotate or tumble as it leaves the payload bay, enabling a flat landing on the delivery surface.

The sliding phase may be enabled by a pusher mechanism at the back of the payload bay. The sliding phase may be enabled by a set of wheels that make contact with the payload.

The sliding phase may enabled through gravity, by opening the payload bay at a steep angle, and then moving the angle closer to the horizontal angle again once the payload has gained momentum.

The transition between the sliding phase and the edge removal phase may be initiated using a heuristic that estimates the time it takes for the payload to slide to the position where edge removal is appropriate.

The transition between the sliding phase and the edge removal phase may be initiated when one or multiple sensors or computer vision systems indicate that the payload, or a payload pusher mechanism, has reached the position where edge removal is appropriate.

The edge removal phase may be accomplished by rapidly turning the main payload axis downward.

The edge removal phase may be enabled by a wall of the payload bay that includes an actuated hinge, such that said wall can be folded downwards.

The edge removal phase may be enabled by a wall of the payload bay with an actuated slider mechanism, such that said wall can be slid out of the way of the payloads trajectory.

The edge removal phase may be enabled by a rapid linear or angular acceleration of the entire drone that significantly reduces the contact force between the payload and the edge of the payload bay.

The rapid acceleration may be achieved by reducing the propeller pitch, using a variable pitch mechanism.

The upper wall of the payload bay may be shorter than the lower wall, for easier payload exit.

The rotation axis of the payload bay may be off-centric, leading to a lower payload position in the opened state compared to the closed state.

3. Landing System for Drone Delivery

In one or more embodiments described hereinafter, a novel landing system for vertical take-off and landing (VTOL) aircraft is described, specifically addressing the challenges in restaurant drone delivery services. One important innovation lies in its ability to facilitate direct drone-to-restaurant interactions without the need for extensive infrastructure, significantly reducing deployment costs and complexity compared to prior art solutions.

In one or more embodiments described hereinafter, a landing system is provided for vertical take-off and landing (VTOL) aircraft, specifically designed for restaurant drone delivery. The system may comprise a landing device with specialized hooks for secure aircraft positioning, sensors for precise landing, and a computer program for automated landing procedures. One important feature is the ability to install the landing device on various structures, including restaurant windows or freestanding bases similar to patio umbrella stands, enabling efficient integration with existing restaurant infrastructure. The system also includes a method for efficient meal handover from restaurants to delivery drones, utilizing a fleet management program and high-precision localization techniques. This system aims to streamline the drone delivery process, enhance safety, and improve efficiency in the rapidly growing food delivery market.

Figure 19:
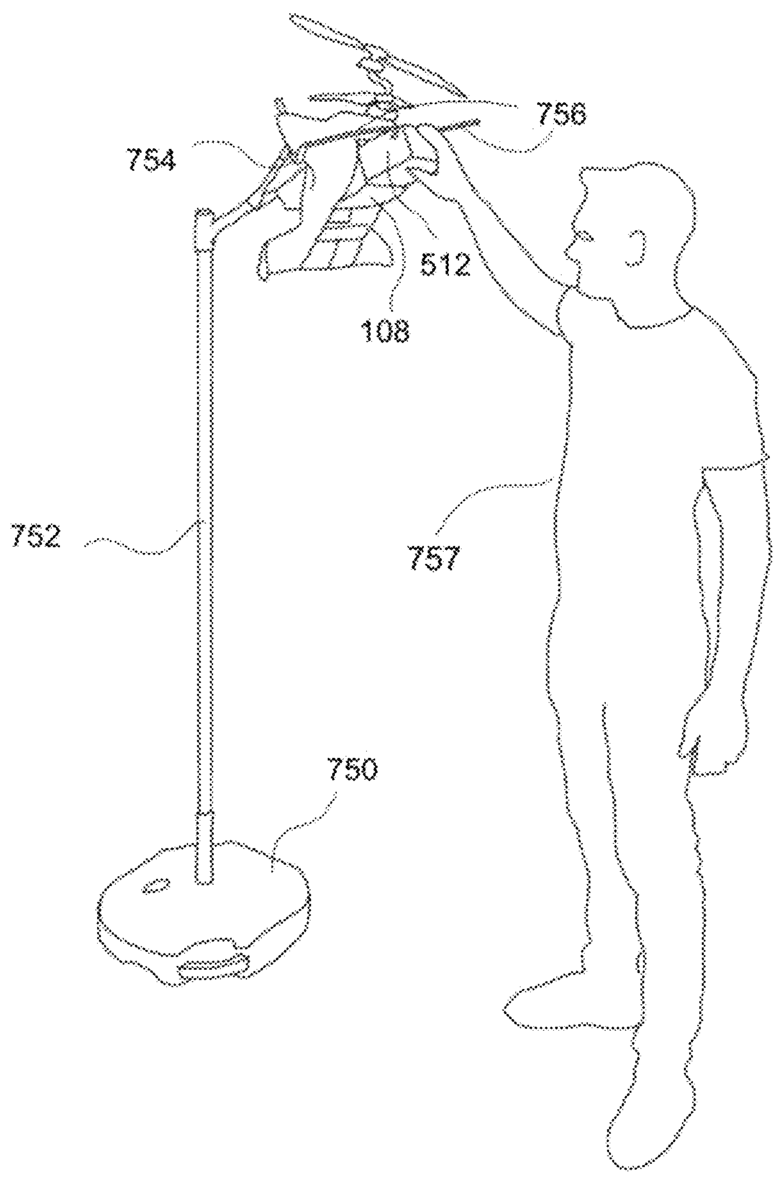
FIG. 19 depicts an illustrative embodiment of a landing device, with a landed aircraft, and a restaurant associate inserting a payload.

The illustrative embodiment of FIG. 19 depicts a freestanding landing device, with a landed aircraft, and a restaurant associate 757 inserting a payload box 512 into the payload bay 108 of the aircraft. As shown in FIG. 19, the freestanding landing device comprises a weighted base 750, a vertical pole 752 connected to the base 750, landing hooks 754, and guide rails 756.

Figure 20:
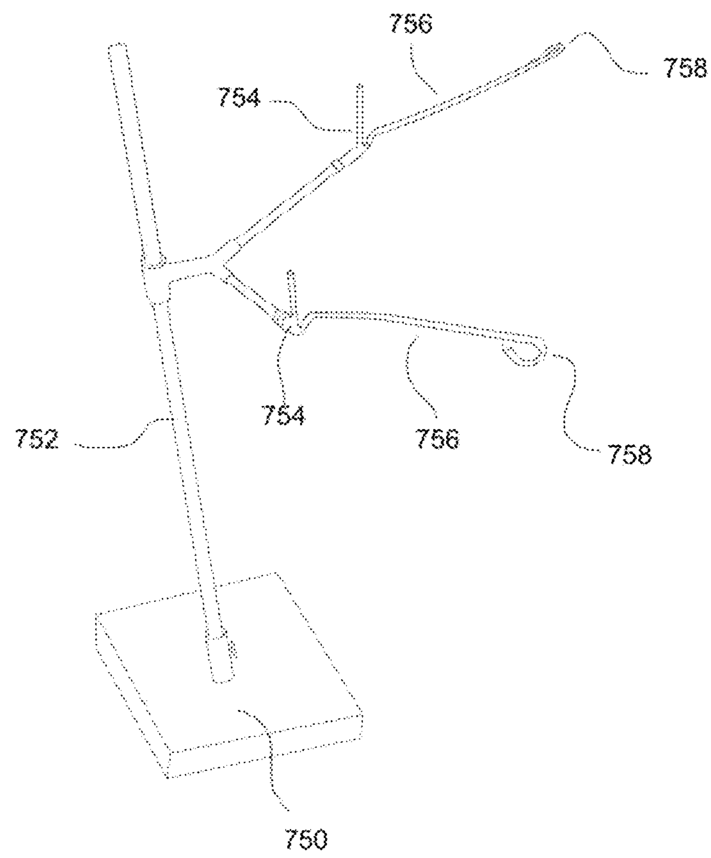
FIG. 20 depicts another illustrative embodiment of the landing device installed on a free standing vertical structure.

Another illustrative embodiment of a freestanding landing device is depicted in FIG. 20. The freestanding landing device of FIG. 20 is similar in many respects to the freestanding landing device of FIG. 19. Although, the ends of the guide rails 756 in FIG. 20 are provided with rounded portions 758 to help prevent the risk of eye injury to a user of the landing device.

Also, in one or more embodiments, installing a drone landing device at the vendor's establishment solves problems associated with the timing between a restaurant associate and the delivery drone not being coordinated correctly. By installing a drone landing device at the restaurant, the delivery drone can land in advance, before the meal is finished, and then the restaurant can hand over the meal to the delivery drone, whenever the restaurant is ready. This results in lower labor cost to the vendor, lower energy cost to the delivery drone, and it also reduces the average waiting time for the customer, because the delivery drone can take off almost immediately after the restaurant finished the meal.

One or more embodiments described hereinafter relate to two primary aspects of drone technology: (1) a landing system for tailsitter vertical take-off and landing (VTOL) aircraft, and (2) a system and method for drone-based restaurant meal handover.

With respect to the landing system for tailsitter VTOL aircraft in the one or more embodiments described hereinafter, the landing system may include, but is not limited to:

1. A landing device with at least two hooks, each characterized by a bottom junction with two upwardly and outwardly extending flanges. This structure is configured to securely hold the aircraft's wings in place.
2. Guide rails, implemented as bars protruding from each hook, along which the aircraft can slide into its final landed position.
3. One or more sensors or a computer vision system enabling the aircraft to accurately determine the position and orientation of the hooks.
4. A program running on the aircraft's processors that manages the landing procedure, positioning the aircraft's wings into the hooks.

With respect to the system and method for drone-based restaurant delivery in the one or more embodiments described hereinafter, the system and method may include, but is not limited to:

1. A non-permanent, or semi-permanent landing device that can be: (i) attached to a restaurant's exterior surface (e.g., a window) using adhesive methods, or (ii) mounted on a freestanding base similar in dimension to commercial patio umbrella stands.
2. A ground or cloud-based fleet management program that coordinates the delivery process, including predictive dispatching of drones based on estimated meal preparation times.
3. A delivery drone equipped with: (i) a GNSS sensor and high-precision localization system utilizing RTK, ultrasound, computer vision, or a combination thereof, and/or (ii) a standardized payload mechanism, potentially integrated into an airfoil-shaped body.
4. Drone safety features including: (i) operations at specified risk-level altitudes, and/or (ii) computer vision algorithms, or systems using remote human operators, to check for obstacles or pedestrians before landing or takeoff.

In some embodiments, a charging system integrated into the landing device to extend drone operational time.

In one or more embodiments, both aspects of drone technology aim to facilitate efficient and safe drone operations in their respective contexts. The tailsitter landing system provides a secure method for vertically oriented aircraft to land and take off, while the restaurant delivery system enables direct drone-to-restaurant interactions without requiring extensive infrastructure modifications.

Now, embodiments of the tailsitter aircraft landing system and the restaurant drone delivery system will be described in detail. While these systems have some individual features, they may share certain software, sensing, and control elements. The detailed description provided hereinafter will detail each system and their potentially shared components.

Initially, embodiments of the tailsitter aircraft landing system will be explained. In one or more embodiments, the landing device comprises at least two hooks, each hook having a structure characterized by a bottom junction with two upwardly and outwardly extending flanges. The hooks are configured such that the trailing edge of the wings can rest at the bottom junction, and the wing surface can lean against one or both of the flanges, providing a stable landed position. The hooks may be constructed from a durable material, such as aircraft-grade aluminum or high-strength composites, to withstand repeated landings.

In these one or more embodiments, the inner surface of each hook may be contoured to match the airfoil profile of the aircraft's wings, providing maximum contact area and stability. In some embodiments, this contour may be lined with a resilient material, such as high-density foam or rubber, to absorb landing forces and prevent damage to the aircraft's surface. However, it should be noted that matching the wing curvature is not mandatory for the landing system to function.

In some embodiments, the landing device may include a guide rail system designed to facilitate smooth and accurate landings. When present, these guide rails are typically elongated structures that protrude outward and slightly upward from the hooks. The guide rails may be constructed from the same material as the hooks for consistency in strength and durability, but this is not a requirement.

When included, the guide rails are positioned to intersect with the aircraft's flight path during the final approach. Their shape and angle may be optimized to gently guide the aircraft into the correct landing position, even if the initial approach is slightly off-center. Importantly, the guide rails may be angled slightly outwards, creating a funnel effect that helps guide the drone into the correct position.

The length and outward angle of the guide rails may be chosen such that the funnel created by the guiderails allows for an error margin of 10-30 cm, matching the precision of typical UAV control systems. The position and shape of the guide rails may be chosen such that the guide rails can make contact with the area where the aircraft body meets the trailing edge of the aircrafts wing, thus allowing both vertical guidance through contact with the wing, and lateral guidance through contact with the body.

In alternative embodiments, there may be separate dedicated guide rails for both vertical trailing edge guidance, and lateral body guidance.

In one or more embodiments, the surface of the guide rails may be treated with a low-friction coating to minimize resistance as the aircraft makes contact. In some embodiments, this may involve the use of polytetrafluoroethylene (PTFE) tubes pulled around circular guide rails for reduced friction.

In one or more embodiments, the guide rails may be angled slightly upwards to assist with landing. However, the guide rails should not be pointed upwards too much, as this could interfere with the propellers. In one embodiment, the root of the guide rails, connected to the hook, may be pointed at an upwards angle, and after 5 to 15 centimeters, the guide rails may bend forward, taking a more horizontal angle. This design ensures that the tip of the guide rails does not interfere with the propellers.

In one or more embodiments, for safety considerations, the ends of the guide rails may feature a rounded design to prevent any risk of eye injury, given that they may be positioned at approximately eye level (see e.g., FIG. 20).

It is important to note that while guide rails can be a valuable feature, they are not mandatory for the functioning of the tailsitter aircraft landing system. Some embodiments may rely solely on precise point landings without the use of guide rails.

Next, the mechanical interaction between aircraft and landing device with be explained. In one or more embodiments, as the aircraft approaches the landing device, the aircraft may first make contact with the guide rails, if present. The low-friction surface of the rails allows the aircraft to slide along them, correcting any lateral misalignment. As the aircraft continues its descent, the wings are guided into the hooks.

In embodiments without guide rails, or in cases where the landing is sufficiently precise, the aircraft may make first contact directly with the hooks.

In one or more embodiments, the hooks are typically designed with a V-shaped opening that becomes progressively narrower. This design allows for a degree of error in the aircraft's vertical position, as the hooks will guide the wings to the correct resting position regardless of the exact point of initial contact. The wide margin for error in the drone's approach is a key feature, with gravity helping to guide the drone into the correct position.

Figure 21:
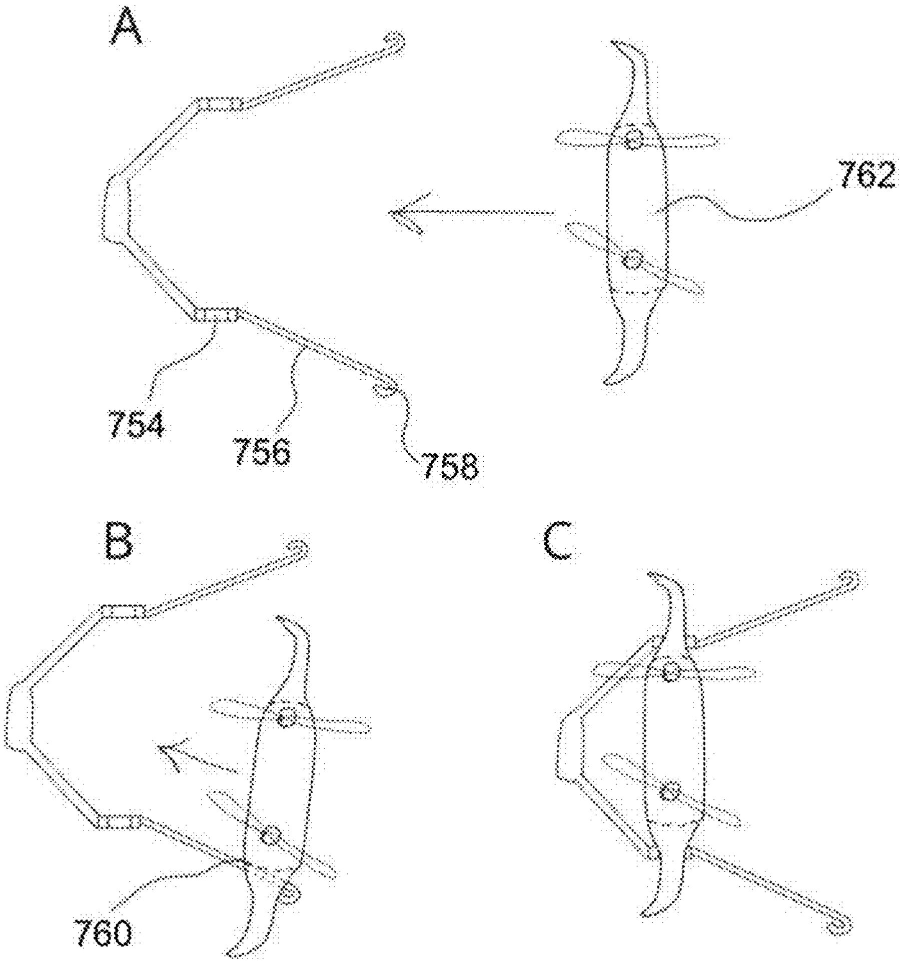
FIG. 21 depicts a top-down view of an illustrative tailsitter drone landing process in a tailsitter drone landing device, where the tailsitter drone approaches the landing device in illustration "A" of this figure, the tailsitter drone makes contact with a guiderail in illustration "B", and the tailsitter drone makes reaches final landing position in illustration "C"

For example, the illustrative embodiment of FIG. 21 depicts a top-down view of an illustrative tailsitter drone landing process in a tailsitter drone landing device. In illustration "A" of FIG. 21, the tailsitter drone 762 is approaching the landing device. In illustration "B" of FIG. 21, the tailsitter drone 762 makes contact with one of the guide rails 756. Finally, in illustration "C" of FIG. 21, the tailsitter drone 762 makes reaches a final landing position.

Figure 22:
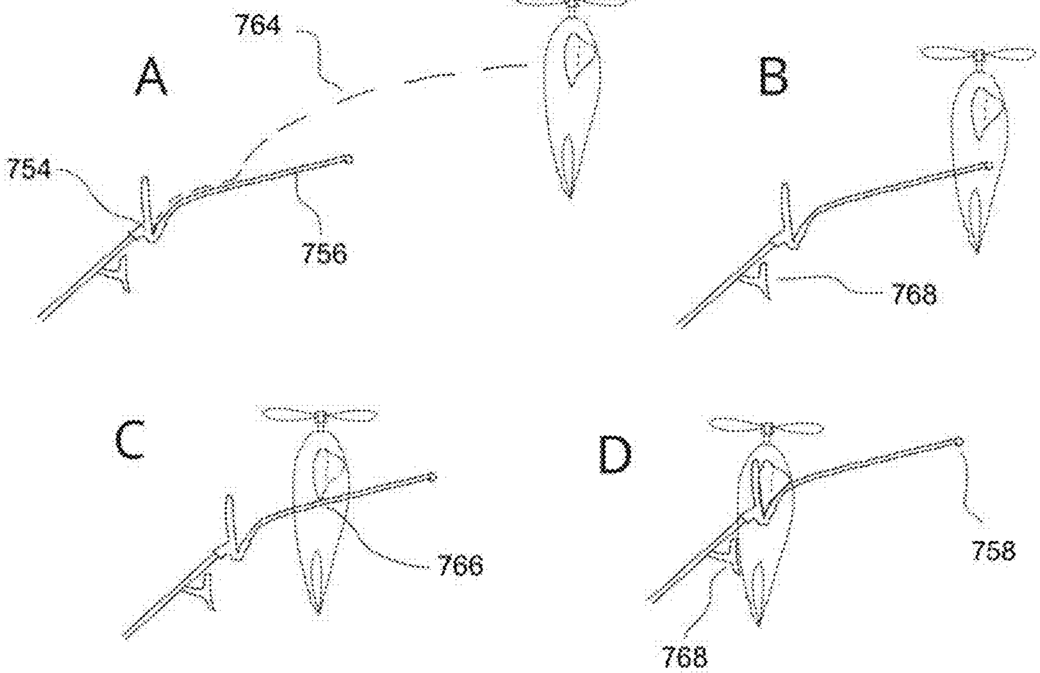
FIG. 22 depicts a side-view of an illustrative tailsitter drone landing process in a tailsitter landing device, where illustration "A" in this figure depicts the approach phase with a planned landing trajectory, illustration "B" depicts the tailsitter drone making contact with a guide rail; illustration "C" depicts the tailsitter drone being guided along the guide rail, and illustration "D" depicts tailsitter drone reaches its final landing position.

As another example, the illustrative embodiment of FIG. 22 depicts a side-view of an illustrative tailsitter drone landing process in a tailsitter landing device. In illustration "A" of FIG. 22, the approach phase with a planned landing trajectory 764 is depicted. In illustration "B" of FIG. 22, the tailsitter drone makes contact with a guide rail 756. In illustration "C" of FIG. 22, the tailsitter drone is being guided along the guide rail 756. In illustration "D" of FIG. 22, the tailsitter drone reaches its final landing position where it is supported by a support element 768 that makes contact with the drone in the landed position, further enhancing the stability of the landed position of the aircraft.

Once fully seated in the hooks, the aircraft's weight and the hook's shape work together to secure the aircraft in place. If present, a resilient lining of the hooks may help to distribute the aircraft's weight evenly, preventing point loads that could damage the wings.

In some embodiments, the landing device may have one or more support elements positioned below the hook. These support elements make contact with the aircraft in the landed position, further enhancing the stability of the landed position of the aircraft.

In one or more embodiments, to enhance the precision of the landing process, the landing device may be equipped with a set of retro reflectors or high-contrast visual markers or patterns. These visual aids are designed to help the aircraft's vision systems accurately locate and align with the landing device.

In one or more embodiments, the landing device may contain visible patterns where some parts are very dark and some parts are very bright. This contrast ensures that at least some parts of the landing device are visible, regardless of the background or lighting conditions.

In one or more embodiments, the visual markers may be strategically placed on the landing device, with a focus on the landing hooks and guide rails, as the precise hook location is crucial for safe landing.

In some embodiments, to enhance the accuracy of the landing process, the aircraft may include an autopilot feature that adjusts the aircraft's yaw in anticipation of guide rail collision. This feature, when present, compensates for the yaw-inducing forces that occur when the aircraft contacts the guide rails.

Figure 23:
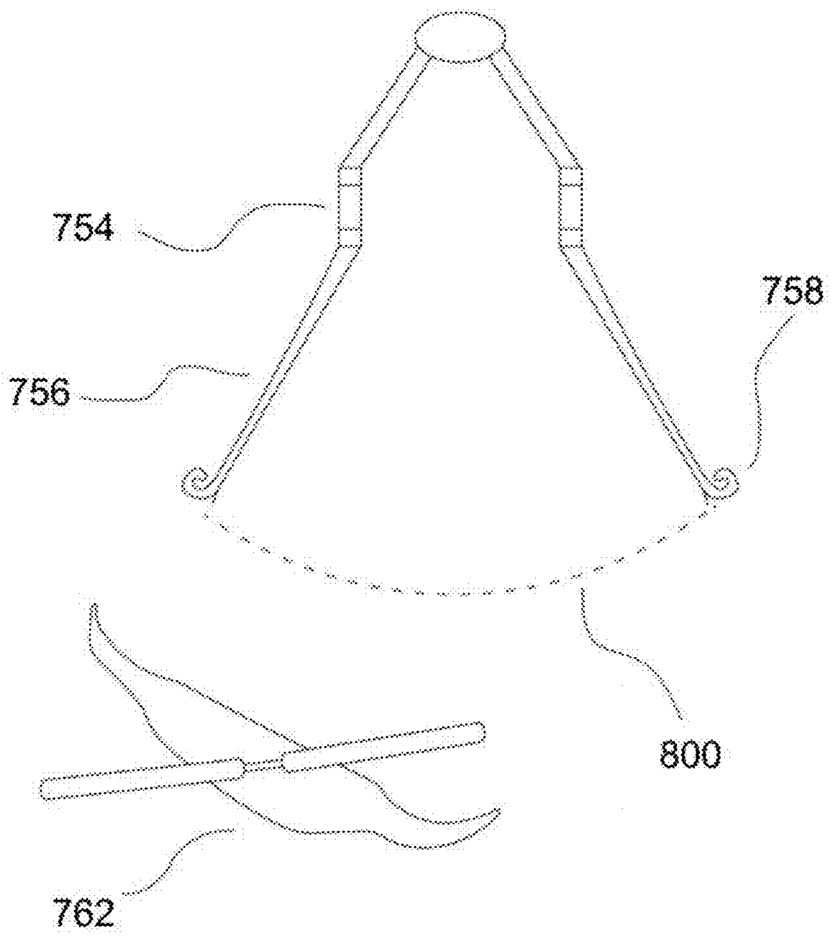
FIG. 23 depicts a yaw angle correction strategy for a landing process of the drone.

For example, the illustrative embodiment of FIG. 23 depicts a yaw angle correction strategy for a landing process of the tailsitter drone 762. In FIG. 23, the ideal yaw angle based on lateral position is denoted by reference numeral 800.

In embodiments that include this feature, the autopilot system uses sensor data to determine the aircraft's position relative to the landing device. As the aircraft approaches the guide rails, the system may calculate the expected yaw moment that will be induced upon contact. The autopilot may then preemptively apply a counter-yaw, helping to ensure that the aircraft remains aligned with the landing device throughout the landing process.

This yaw adjustment, when implemented, is typically achieved through differential motor torque of the aircraft's propellers. The magnitude of the yaw adjustment may be calibrated based on factors such as the aircraft's approach speed, mass, and the specific geometry of the landing device.

It is important to note that while this yaw adjustment feature can enhance landing precision in some embodiments, it is not a mandatory component of the tailsitter aircraft landing system.

Now, embodiments of the restaurant drone delivery system will be described in detail. Initially, the landing device for restaurants will be explained. In one or more embodiments, the restaurant landing device is designed to be easily attached to the exterior of a restaurant or mounted on a freestanding structure. Two primary implementation methods are described: (i) glass window attachment and (ii) patio stand mounting. Both methods may be equally viable, with the choice depending on the specific restaurant setup and local regulations.

First of all, one or more embodiments of the glass window attachment method will be explained. In embodiments where the landing device is attached to a glass window or storefront, the attachment method may utilize a combination of high-strength suction cups and adhesive pads.

Figure 24:
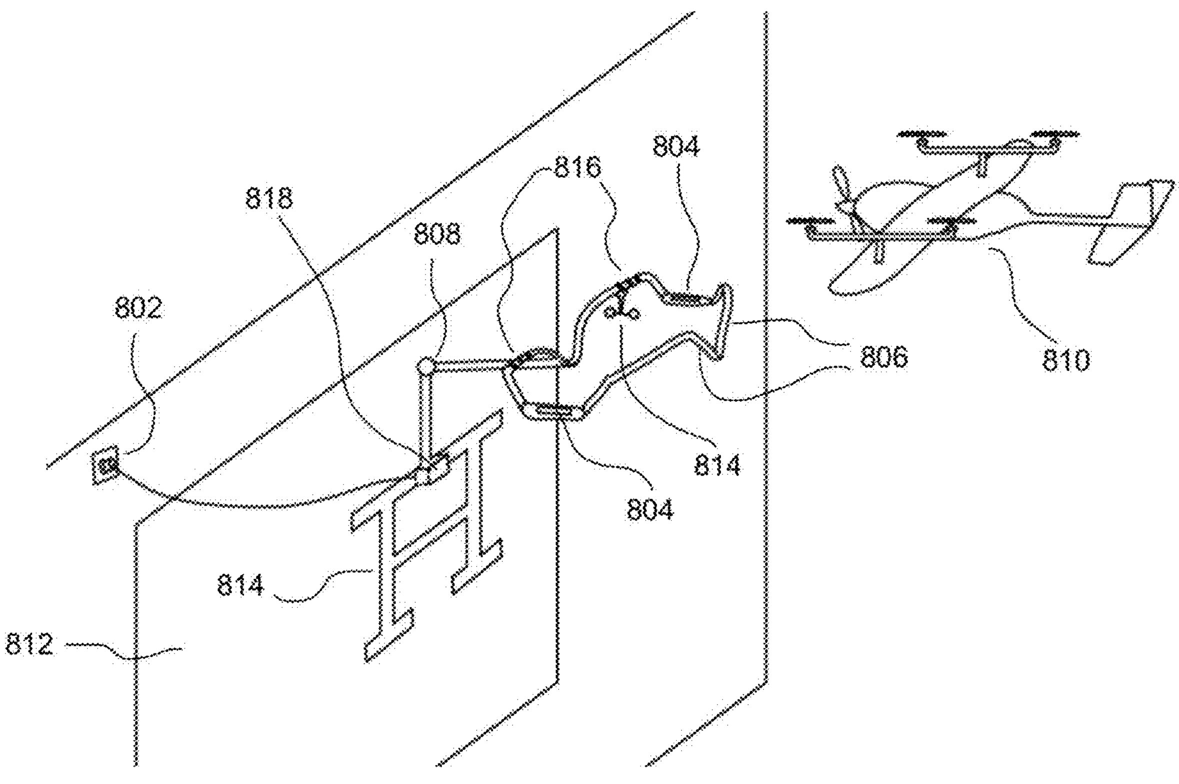
FIG. 24 depicts an illustrative embodiment with a window-mounted landing system.
Figure 25:
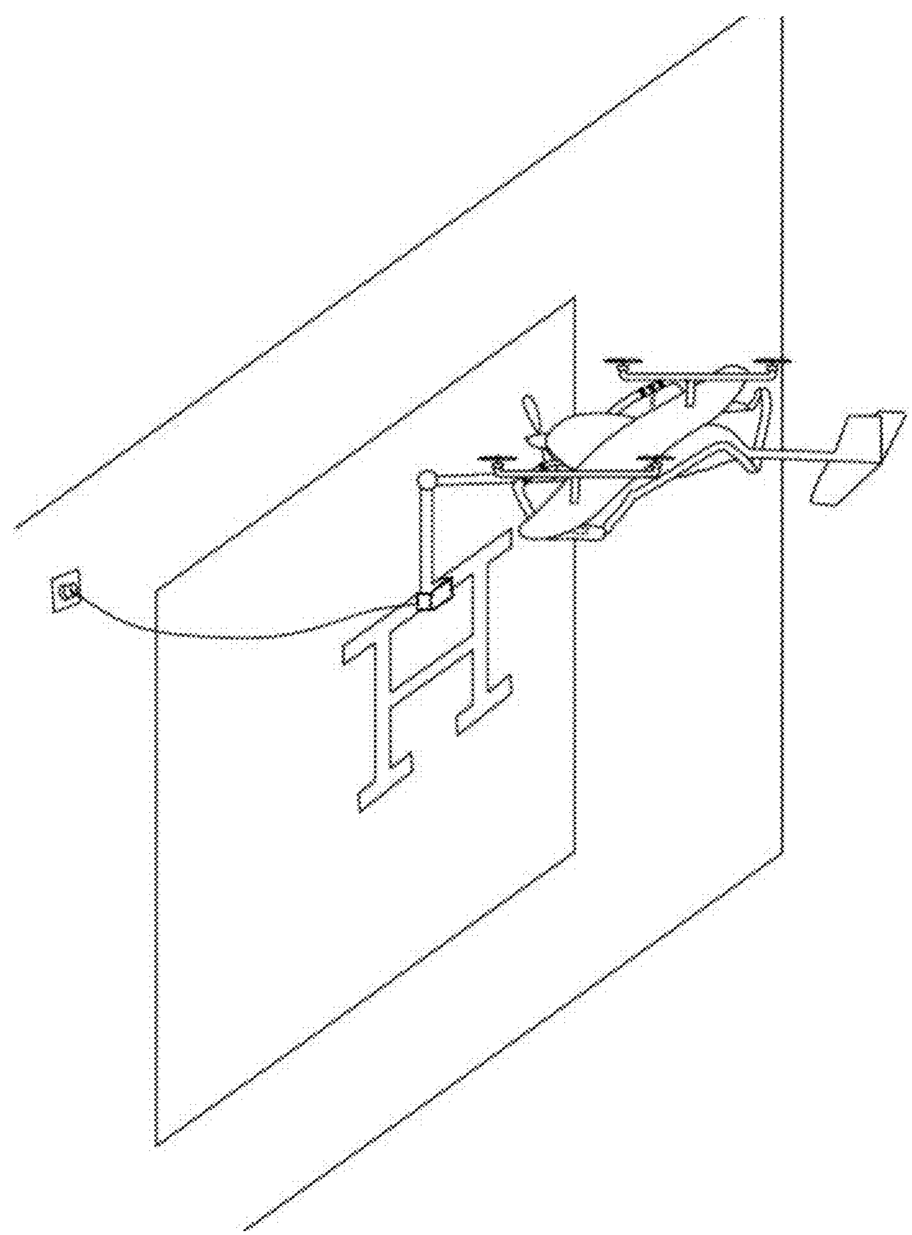
FIG. 25 depicts the illustrative embodiment of FIG. 24, wherein the drone is in a landed state.
Figure 26:
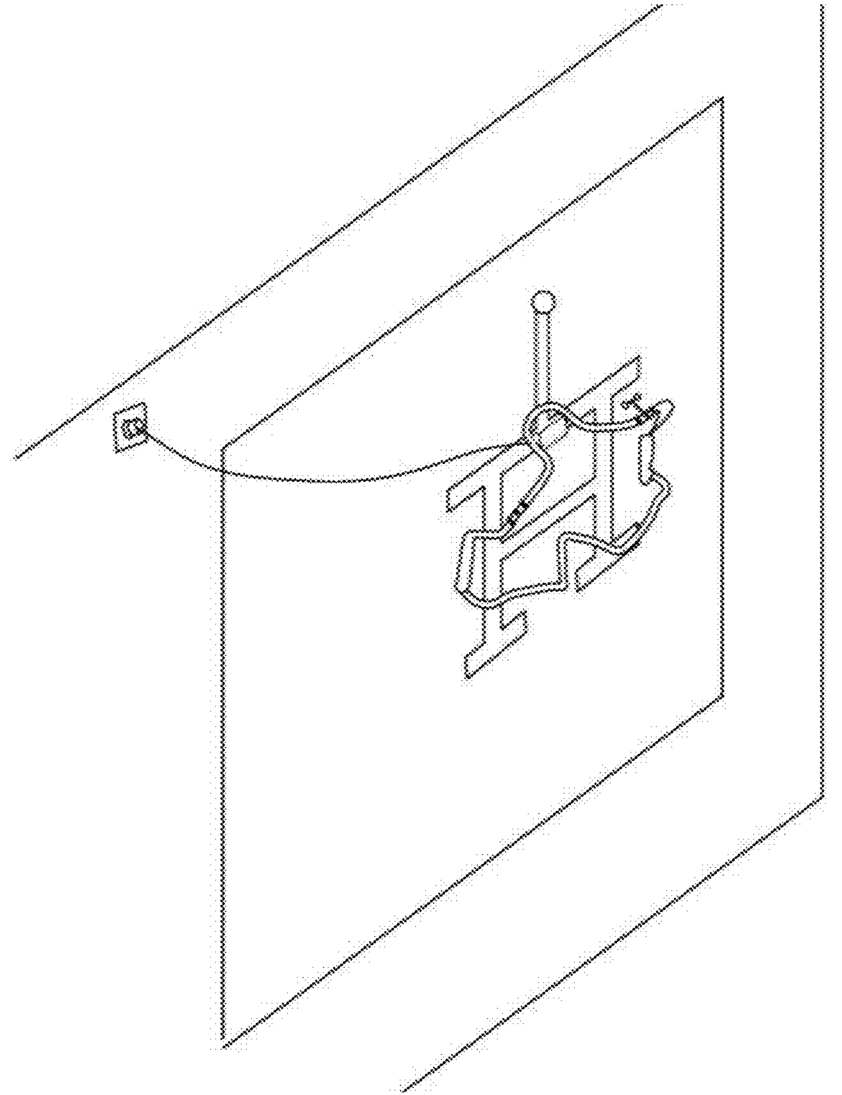
FIG. 26 depicts the illustrative embodiment of FIG. 24, wherein the landing device is in a retracted state.

The illustrative embodiment of FIG. 24 depicts one example of a window-mounted landing system for a drone-type aircraft 810. As shown in FIG. 24, the window-mounted landing device is attached to the window 812. In the illustrative embodiment of FIG. 24, the window-mounted landing device comprises guiding elements 806 and an actuated hinge 808 that may include a mechanical damper. In addition, as shown in the illustrative embodiment of FIG. 24, the window-mounted landing device further comprises charging contacts 804 for charging the drone-type aircraft 810 while the aircraft 810 is disposed in the landing device. As shown in FIG. 24, the charging contacts 804 are electrically coupled to an electrical device 818 which, in turn, is electrically coupled to an electrical outlet 802 via a cord. Further, as shown in the illustrative embodiment of FIG. 24, the window-mounted landing device may comprise a wind measurement device 814 (e.g., an anemometer) and high contrast visual patterns 816 thereon. FIG. 25 depicts the illustrative embodiment of FIG. 24, wherein the drone 810 is in a landed state. FIG. 26 depicts the illustrative embodiment of FIG. 24, wherein the landing device is in a retracted state.

Figure 27:
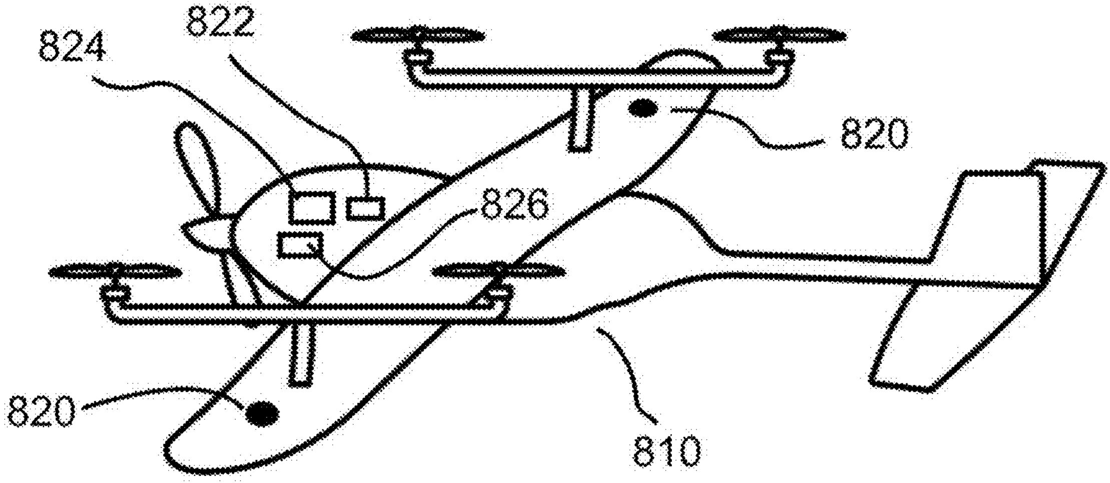
FIG. 27 depicts the aircraft of the illustrative embodiment depicted in FIG. 24.

FIG. 27 depicts the drone-type aircraft 810 of the illustrative embodiment depicted in FIG. 24 in more detail. As shown in FIG. 27, the drone-type aircraft 810 comprises wide angle cameras 820, a global navigation satellite system (GNSS) module 822, a flight computer 824, and an ultrasound emitter and receiver 826.

Figure 28:
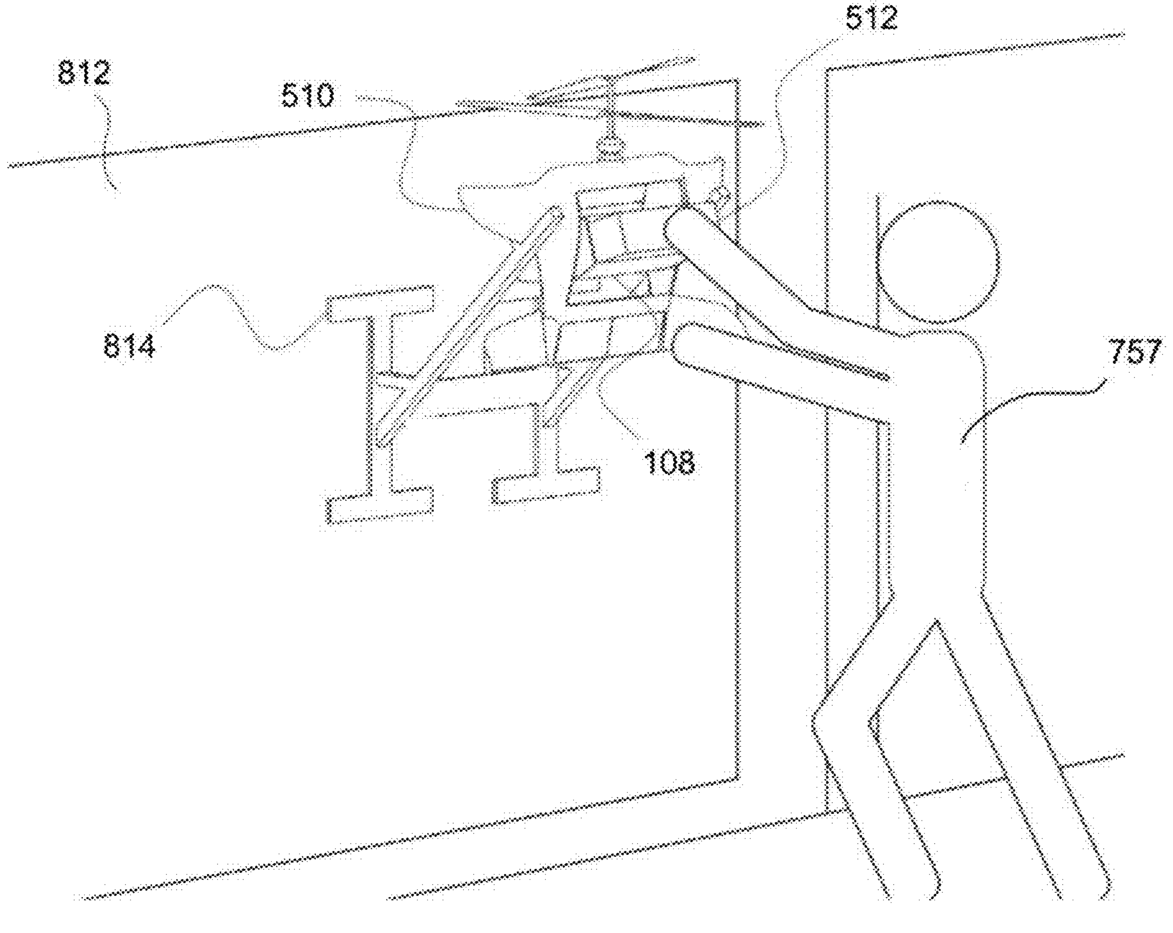
FIG. 28 depicts an alternative embodiment of a window mounted landing system.
Figure 29:
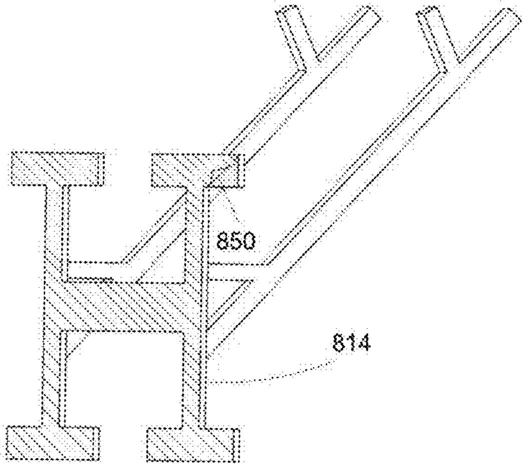
FIG. 29 depicts an illustrative embodiment of a window-mounted landing device.

FIG. 28 depicts an alternative embodiment of a window mounted landing system. In the embodiment of FIG. 28, the landing device of the window mounted landing system may comprise an H-shaped attachment structure 814 for attaching the landing device to the window 812. The H-shaped attachment structure 814 may comprise an adhesive material on the backside thereof for attachment to the window 812. For example, as shown in FIG. 29, a removable cover 850 may be provided over the adhesive material on the backside of the H-shaped attachment structure 814.

In these one or more embodiments, the suction cups, when used, may be made from a durable, UV-resistant silicone material and designed to maintain their grip over extended periods. Each suction cup may be equipped with a lever mechanism that creates a strong vacuum seal when engaged. To prevent unauthorized removal, these levers may be designed to be operable only with a special tool.

In these one or more embodiments, when adhesive pads are used, they may provide additional security and may be composed of a weather-resistant, industrial-grade adhesive. This adhesive should be strong enough to support the weight of the landing device and drone but can be removed without damaging the glass surface when proper removal procedures are followed.

In embodiments using the glass window attachment method, the installation process may include the following steps:

1. A trained specialist selects an appropriate location on the glass surface.
2. The specialist thoroughly cleans the selected area to ensure optimal adhesion.
3. If using adhesive pads, the specialist removes the protective sheet from the adhesive.
4. The specialist holds the landing device against the glass surface and applies sufficient pressure for the required amount of time to ensure proper attachment.

Secondly, one or more embodiments of the patio stand design and implementation will be explained. For restaurants without suitable window space, or where preferred, the landing device may be mounted on a freestanding patio stand. This stand is designed to be stable and secure while maintaining a relatively small footprint.

In one embodiment, the patio stand may comprise a heavy base plate, similar in size and shape to common patio umbrella stands. The base may be filled with sand or water to increase stability. A vertical pole extends from this base, with the landing device mounted at the appropriate height.

It is worth noting that, in some embodiments, an actual patio umbrella stand may be repurposed for this use. Someone skilled in the art may replace the umbrella with the landing device, providing a cost-effective and readily available solution.

In these one or more embodiments, the stand may be constructed from weather-resistant materials such as powder-coated steel or aluminum, although this is not a requirement for all embodiments. The stand may include adjustable feet to ensure stability on uneven surfaces and may also include anchor points for additional security in high-wind areas.

In some embodiments, to minimize the landing device's profile when not in use, a retractable mechanism may be incorporated into the design. When present, this mechanism allows the landing hooks and guide rails (if included) to fold against the main body of the device.

In one possible implementation of this feature, the retraction may be achieved through a spring-loaded hinge system. When activated, either manually or via an electric motor, the hooks and guide rails may pivot inward, lying flat against the device body. This retracted position can reduce the device's wind resistance and visual impact when not in use.

If included, the retraction mechanism may feature a locking system in both the extended and retracted positions to prevent unwanted movement. In motorized versions, the retraction may be triggered automatically based on scheduled delivery times or weather conditions.

In some embodiments, the landing device may incorporate a wind measurement system to ensure safe landing conditions. This system, when present, may consist of an anemometer integrated into the upper portion of the landing device.

When included, the anemometer may continuously measure wind speed and direction, transmitting this data to the drone and/or a central control system. If wind speeds exceed predetermined safety thresholds, the system can automatically signal the drone to abort the landing attempt.

The wind data may be communicated to the drone either wirelessly or through visual cues that can be detected by the drone's computer vision system.

In addition to or instead of an anemometer, the wind measurement system may include visual indicators such as small, lightweight streamers or flags attached to the landing device. These streamers provide a visual reference for wind conditions, which can be observed by the drone's onboard cameras during the final approach. This passive mechanical method of wind indication can serve as a reliable and low-tech solution for wind measurement.

In some embodiments, small strings may be suspended from the landing hook to serve as passive wind indicators. The drone's computer vision system may analyze the state of these strings to estimate wind conditions. This method provides a simple yet effective means of wind measurement without requiring powered components on the landing device.

In one or more embodiments, the restaurant drone delivery system may employ an altitude-based risk mitigation strategy to enhance safety during landing and takeoff operations. This strategy may define three altitude zones: (i) high-risk, (ii) medium-risk, and (iii) low-risk.

In some embodiments, high-risk altitudes may be defined as those where the drone's propellers could potentially come into contact with a person of average height. Medium-risk altitudes may be those where the drone is above head height but still within reach of an extended arm. Low-risk altitudes may be those above the reach of an extended arm.

The system may be designed to minimize time spent in high-risk altitudes. During landing and takeoff, the drone may rapidly transition through high-risk altitudes, only slowing its vertical speed when it reaches medium-risk or low-risk altitudes.

Figure 30:
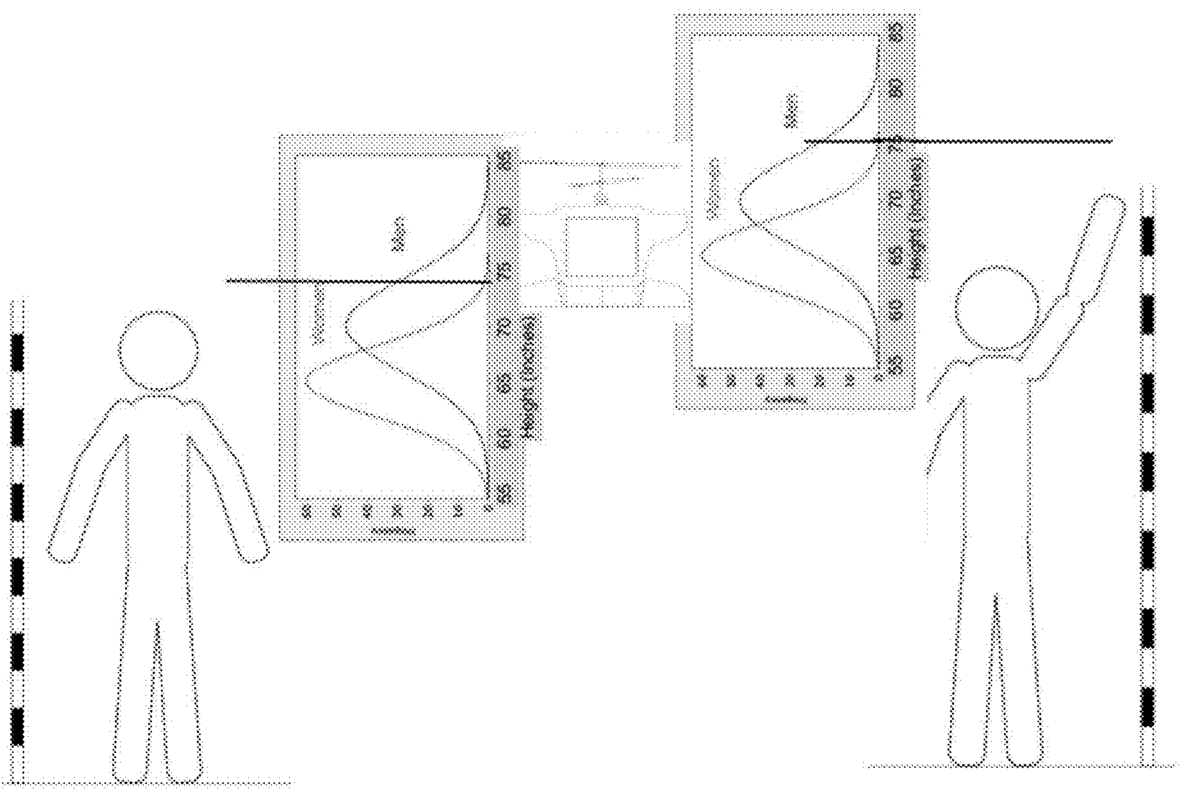
FIG. 30 depicts a schematic diagram illustrating the statistical height distribution of men and women, within the context of the drone landing device installation height.

In one embodiment, the landing device may be positioned at a height that allows the drone to complete its landing sequence within the medium-risk or low-risk altitude zone, while still allowing restaurant staff to insert or remove the payload. This positioning may require the use of the patio stand in some installations. FIG. 30 depicts a schematic diagram illustrating the statistical height distribution of men and women, within the context of the drone landing device installation height.

Next, drone-restaurant interaction in one or more embodiments will be described, which will begin with the discussion of the payload loading/unloading process. In one or more embodiments, the payload loading and unloading process may be designed to be simple and efficient for restaurant staff while maintaining the security of the drone and its cargo.

For loading, the drone's payload bay may remain closed until the drone detects an authorized user approaching with a package. This detection may be achieved through various methods, which may include computer vision systems, radio frequency identification (RFID) technology, or a signal from a smartphone or similar device operated by the restaurant staff.

Once an authorized user is detected or a valid signal is received, the payload bay may open automatically. In some embodiments, the payload bay may be designed with features to facilitate easy loading, such as a slight downward tilt or a low-friction surface. However, these features are not mandatory for the functioning of the payload bay of the dronc.

In one or more embodiments, the restaurant drone delivery system may further include fleet management and coordination, the fleet management and coordination functionality may include timing optimization for restaurant preparedness. In one or more embodiments, the system may include a sophisticated timing optimization algorithm to coordinate drone arrivals with meal preparation times. This algorithm may take into account various factors to estimate meal preparation times accurately.

In one or more embodiments, the system may use a database that stores information about average food preparation times. This information may be based on the average preparation times of various meals and may also contain the standard deviation of the preparation time. The database may store specific information about each individual restaurant associated with the food delivery service, including average preparation time and standard deviation for each restaurant and potentially for specific meals within a restaurant's menu.

In some embodiments, the system may gather this information by registering the exact time at which the restaurant associate hands over the meal to the delivery drone and comparing it to the time at which the electronic food delivery marketplace received the customer order. Over time, these order times may be aggregated and processed with a statistical model to obtain averages and standard deviations for preparation times.

The system may use this information to compute the ideal time at which a delivery drone should be instructed to start flying towards the restaurant. In one embodiment, this ideal start time may be calculated as the sum of the expected flight time and a certain percentile of the preparation time implied by the expected preparation time and standard distribution. For example, the system might use the 5th percentile of preparation time, ensuring that in 95% of all orders, the delivery drone would arrive before meal preparation is finished.

In some embodiments, the percentile used may not be fixed but may be based on a cost function that considers factors such as the cost associated with the restaurant associate waiting for the drone and the cost of the drone waiting for the meal preparation to be finished.

The system may also include a feedback mechanism where restaurant staff can indicate if a meal will be ready earlier or later than initially predicted. This information may be used to adjust the drone's arrival time in real-time.

Now, software, sensing, and control systems in one or more embodiments will be described. The following systems may be applicable to both the tailsitter aircraft landing system and the restaurant drone delivery system: (i) navigation and control for landing, and (ii) localization methods.

In one or more embodiments, the control systems may employ multiple localization methods to ensure accurate and reliable landing that utilize: (i) a retroreflector system with IR LEDs, (ii) a neural network-based computer vision system, and/or (iii) an ultrasound-based system. Some embodiments may choose to use visible LEDs, instead of IR LEDs, and some embodiments may use LEDs with a narrow light spectrum, making it easier to distinguish the retro reflectors from ambient light.

In the one or more embodiments utilizing the retroreflector system with IR LEDs, the landing device may be equipped with retroreflective markers. The drone may be fitted with infrared (IR) LED emitters and cameras. The IR LEDs may emit light in a concentrated frequency band to distinguish it from ambient light. During the landing approach, the drone may emit IR light, which is reflected by the markers. The reflected light may be detected by the drone's cameras, allowing it to precisely determine its position relative to the landing device through triangulation.

In the one or more embodiments utilizing the neural network-based computer vision system, a deep learning model trained on a large dataset of landing device images taken from various angles and distances. The drone's onboard cameras may capture images during the approach, which may be processed by the neural network to determine the drone's position and orientation relative to the landing device.

In the one or more embodiments utilizing the ultrasound-based system, both the landing device and the drone may be equipped with ultrasound emitters and receivers. By measuring the time differences between pulse emission and reception at different points, the drone may triangulate its position relative to the landing device. The ultrasound-based system may be used as an alternative or complement to the IR system.

The system may also include landing approach and alignment features. In one or more embodiments, the landing approach may be executed in phases:

1. Initial Approach: Using GPS and inertial navigation, the drone may navigate to a predetermined waypoint near the landing device.
2. Final Approach: As the drone nears the landing device, it may switch to the more precise localization methods described above. In addition, the final approach phase may include an abort procedure which may be triggered if the drone position differs from the ideal landing trajectory by more than a certain margin.
3. Alignment: The drone may align itself with the guide rails (if present), adjusting its position and orientation based on real-time sensor data.
4. Touchdown: The drone may descend towards the landing device. In some embodiments, particularly those with guide rails, the drone may maintain some forward momentum during touchdown to aid in sliding along the guide rails into the final landing position.

The system may also include landing approach and alignment features. In one or more embodiments, the landing approach may be executed in phases:

In one or more embodiments, both the tailsitter aircraft landing system and the restaurant drone delivery system may incorporate computer vision algorithms for human detection and safety. These algorithms may process images from the drone's onboard cameras in real-time, identifying humans and other potential obstacles.

In one embodiment, the system may use a convolutional neural network trained on a diverse dataset of human images in various poses and clothing. This network may rapidly identify humans in the drone's vicinity, allowing the system to adjust its behavior accordingly.

Alternatively, the system may rely on a remote operator who reviews camera feeds from the drone to make safety decisions. This human-in-the-loop approach may be used either as the primary safety system or as a backup to the automated system. The drone may be equipped with multiple wide-angle cameras that provide a comprehensive view of the landing area. These feeds are transmitted in real-time to the remote operator, who can assess for potential hazards not easily detectable by automated systems. The operator may have a limited time window to make a decision, after which the system defaults to a predetermined safe action, such as aborting the landing. This approach combines the benefits of human judgment with the efficiency of automated systems, particularly useful in complex urban environments or unusual weather conditions.

In one or more embodiments, the landing system may utilize sensor integration for enhanced landing accuracy. In these one or more embodiments, the landing system may integrate data from multiple sensors to achieve high accuracy. These sensors may include:

1. Inertial Measurement Units (IMUs) for detecting the drone's orientation and acceleration.
2. Barometric pressure sensors for altitude measurement.
3. Optical flow sensors for detecting lateral movement.
4. Time-of-flight sensors for precise distance measurement.

In these one or more embodiments, data from these sensors may be fused using algorithms to provide a robust and accurate estimate of the drone's state during the landing process.

In one or more embodiments, the control system for final approach and touchdown may use various control algorithms to guide the drone to a safe landing. These algorithms may take into account the drone's position relative to the landing device, as well as other factors such as wind conditions and payload weight.

In one or more embodiments, both the tailsitter aircraft and the restaurant delivery drone may incorporate charging systems to extend operational time, although this is not a requirement for all embodiments.

In one embodiment, the landing device may include conductive contact pads that align with corresponding pads on the aircraft or drone. When the aircraft or drone is securely landed, these pads may make contact, allowing for electrical charging.

An alternative embodiment may use inductive charging, where a coil in the landing device induces a current in a corresponding coil on the aircraft or drone. This method may allow for charging without the need for precise alignment of contact pads.

The charging system, when present, may include safety features such as voltage and current regulation, temperature monitoring, and automatic cutoff in case of faults. The charging system may also incorporate a communication protocol that allows the aircraft or drone to negotiate charging parameters with the landing device, ensuring optimal charging rates based on battery condition and operational needs.

The present application further discloses a landing system for VTOL aircraft, comprising: a landing device with at least 2 hooks, each hook having a structure characterized by a bottom junction with two upwardly and outwardly extending flanges from that junction. The hooks are configured such that the trailing edge of the wings can rest at the bottom junction, and the wing surface can lean against one or both of the flanges, providing a stable landed position.

The landing system further comprises: one or more sensors or a computer vision systems that allow the aircraft's flight control system to know the position and orientation of the hooks; a program running on one or multiple processors on the aircraft, where said program causes the aircraft to position its wings into the open area of the hooks, and subsequently lower the aircraft wings into the hooks.

The landing system may comprise a bar that protrudes from each hook, where said bars constitute a set of guide rails, along which the aircraft can slide, leading the aircraft to the final landed position.

The landing system may be configured in such a way that the guide rails are near the area where the trailing edge of the wing meets the body of the aircraft, enabling the guide rail to provide both vertical guidance through contact with the wing, and horizontal guidance through contact with the body.

The guide rail surface may be made of a low friction material, and aach guide rail may have a rounded feature at the end that prevents people from poking their eyes at the end of the guide rail.

The landing device may have one or more support elements positioned below the hook, that make contact with the aircraft in the landed position, further enhancing the stability of the landed position of the aircraft.

The landing device may have a set of passive reflectors or high contrast visual markers or patterns, helping the aircraft locate the hooks.

The landing device may have exposed electrical contacts that are positioned in such a way that they make contact with corresponding electrical contacts on the aircraft, through which the batteries of the aircraft can be charged. The landing device and aircraft may be equipped with a set of coils, allowing for inductive battery charging.

The present application still further discloses a system for handing over a meal from a restaurant to a delivery drone. The system comprises: a ground or cloud based fleet management program; a landing device, attached either (i) to a glass window or storefront of the restaurant, using at least one flat adhesive contact surface (ii) to the upper part of a vertical structure attached to a base, where said base has significant weight and footprint to ensure stability and where said base has dimensions that fall within the range of commercial patio umbrella stands; a delivery drone equipped with a GNSS sensor and a high precision localization system that directly or indirectly tells the relative position between the drone and the landing device, using position sensors, such as, for example, RTK, ultrasound, computer vision, or a combination thereof.

The ground or cloud based fleet management program may send a drone to the restaurant before the meal has been finished, and the delivery drone may use the GNSS sensor and the high precision localization system to land on the landing device, waits for restaurant staff to insert a payload, and takes off afterwards.

The landing device of the system may include a set of walls or bars that physically guide the drone into the landed position. The ground or cloud based fleet management program may use a heuristic to predict the food preparation time of the restaurant, and sends a drone to the restaurant at a time such that there is a very high likelihood that the drone will arrive before the meal finished, while still minimizing the time spent waiting at the restaurant.

The landing device may have an electric cable plugged into a power outlet of the restaurant, as well as a set of charging contacts or inductive coils that can automatically charge the drone when landed.

The height at which the landing device is installed may be chosen in such a way that it is high enough to keep the drones rotor blades away from human bystanders, and low enough that the payload hatch can still be reached by someone of average height who is extending their arm.

The system may further comprise a program that causes the delivery drone to hover at a safe altitude and distance from the landing device, and to send camera images to a remote operator, and wait for the remote operator to confirm that the area is clear for landing, before instructing the delivery drone to complete the landing procedure.

The system may further comprise a program that causes the delivery drone to send camera images to a remote operator before takeoff, and wait for the remote pilot to confirm that the area is clear for landing, before instructing the delivery drone to complete the takeoff procedure.

The system may further comprise a computer vision algorithm that checks whether the landing area is clear, before the delivery drone is instructed to complete the landing procedure.

The system may further comprise a computer vision algorithm that checks whether the area is clear for takeoff, before the delivery drone is instructed to complete the takeoff procedure.

The attachment to the glass window or storefront may include a damping mechanism, to reduce the indoor noise and the mechanical stress caused by the landing of the drone.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not. by the preceding description.

The invention claimed is:

1. An unmanned aerial vehicle, comprising:

a vehicle body, the vehicle body comprising a front end, a rear end opposite the front end, and a longitudinal axis between the front end and the rear end, the vehicle body further comprising an airfoil shape and at least one wing formed by the vehicle body;

a plurality of rotors disposed at the front end of the vehicle body, each rotor comprises at least one attached propeller blade, the plurality of rotors being operative to provide forward thrust in a direction of the longitudinal axis;

a payload void, the payload void being formed by the vehicle body and disposed within the airfoil shape of the vehicle body, the payload void comprising a majority of a volume of the vehicle body;

a payload bay, the payload bay configured to receive a payload, the payload bay being disposed at least partially within the payload void; and a flight control system, the flight control system comprising:

at least one motor to drive the plurality of rotors;

at least one accelerometer;

at least one gyro; and a control module configured to lift and lower the vehicle in a tail-sitter orientation, transition between a tail-sitter orientation and a winged flight orientation, and control a winged flight.

2. The vehicle of claim 1, further comprising:

the at least one wing comprises a pair of wings formed by the vehicle body, each wing comprises a proximate end connected to the vehicle body and a distal end apart from the vehicle body, each wing disposed on an opposing side of the vehicle body, and wherein the plurality of rotors are disposed such that when the propeller blades are rotating they collectively span at least 75 percent of a wingspan.

3. The vehicle of claim 2 wherein at least two rotors of the plurality of rotors comprise blades that overlap with each other.

4. The vehicle of claim 3 wherein at least one rotor of the plurality of rotors have a diameter greater than 40 percent of the wingspan.

5. The vehicle of claim 1, wherein the plurality of rotors comprises two rotors, and each rotor comprises two blades attached thereto.

6. The vehicle of claim 1, wherein the plurality of rotors comprises three rotors, a first rotor of the three rotors comprises a single attached blade, and a second rotor of the three rotors comprises two attached blades.

7. The vehicle of claim 1, further comprising an S-rod, the S-rod supporting at least one rotor of the plurality of rotors.

8. The vehicle of claim 1, further comprising a variable pitch mechanism associated with at least one rotor of the plurality of rotors.

9. The vehicle of claim 8, whereby rapid acceleration is achieved by reducing a propeller pitch, using the variable pitch mechanism.

10. The vehicle of claim 1, wherein the at least one wing is disposed proximate to the front end of the vehicle body.

11. The vehicle of claim 1, wherein the at least one wing is contoured so as to be continuously formed by the vehicle body.

12. The vehicle of claim 1, further comprising at least one actuator, each actuator operative to increase a surface area of the at least one wing.

13. An unmanned aerial vehicle, comprising:

a vehicle body, the vehicle body comprising a front end, a rear end opposite the front end, and a longitudinal axis between the front end and the rear end, the vehicle body further comprising an airfoil-shaped main body portion and at least one wing formed by the vehicle body, where said airfoil-shaped main body portion forms a majority of an entire lifting surface of the vehicle;

one or more rotors disposed at the front end of the vehicle body, each rotor comprises at least one attached propeller blade, the one or more rotors being operative to provide forward thrust in a direction of the longitudinal axis, wherein the one or more rotors are disposed such that when the one or more rotors are rotating a sum of all propeller diameters is at least 75% of a wingspan of the vehicle;

a payload void, the payload void being formed by the vehicle body and disposed within said airfoil-shaped main body portion of the vehicle body, the payload void comprising a majority of a volume of the vehicle body; and a payload bay, the payload bay configured to receive a payload, the payload bay being disposed at least partially within the payload void.

14. The vehicle of claim 13, further comprising a variable pitch mechanism associated with at least one rotor of the one or more rotors.

15. The vehicle of claim 13, wherein at least one rotor of the one or more rotors has a diameter greater than 40 percent of the wingspan of the vehicle.

16. The vehicle of claim 13, wherein the one or more rotors comprise a plurality of rotors, and at least two rotors of the plurality of rotors comprise blades that overlap with each other.

* * * * *